US012804213B2

United States Patent
(12) United States Patent
Reilly

(10) Patent No.: US 12,804,213 B2
(45) Date of Patent: Nov. 17, 2026

(54) TIME-BASED CLIENT-SIDE SIGNING OF CONTENT DELIVERY NETWORK UNIVERSAL RESOURCE IDENTIFIERS

(71) Applicant: Charter Communications Operating, LLC, St. Louis, MO (US)

(72) Inventor: Gregory F. Reilly, Lone Tree, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 33 days.

(21) Appl. No.: 18/971,932

(22) Filed: Dec. 6, 2024

(65) Prior Publication Data

US 2026/0164071 A1 Jun. 11, 2026

(51) Int. Cl.
*H04N 21/258* (2011.01)
*H04L 9/08* (2006.01)

(52) U.S. Cl.
CPC ..... *H04N 21/25816* (2013.01); *H04L 9/0825* (2013.01); *H04L 9/0863* (2013.01)

(58) Field of Classification Search
CPC ............ H04N 21/25816; H04L 9/0825; H04L 9/0863
See application file for complete search history.

(56) References Cited

U.S. PATENT DOCUMENTS

| | | | | |
|---|---|---|---|---|
| 11,601,807 B2 * | 3/2023 | Masure | ................. | H04W 12/06 |
| 12,095,753 B2 * | 9/2024 | Grinman | ............. | H04L 63/0846 |
| 2019/0289017 A1 * | 9/2019 | Agarwal | ............... | H04L 9/0643 |
| 2020/0106778 A1 * | 4/2020 | Park | ...................... | H04L 65/612 |
| 2022/0329579 A1 * | 10/2022 | Grinman | ............... | H04L 9/3213 |

* cited by examiner

*Primary Examiner* — Nathan J Flynn
*Assistant Examiner* — Christine A Kurien
(74) *Attorney, Agent, or Firm* — The Marbury Law Group, PLLC

(57) ABSTRACT

Various embodiments describe methods, systems, and devices for time-based signing of content delivery network (CDN) universal resource identifiers (URIs). An authentication service may be configured to provide a time-based one-time password (TOTP) to a streaming media device. The TOTP from the authentication service may be a representation of a combination of a modified time for the TOTP and a secret key shared by the authentication service with a CDN. The streaming media device may be configured to provide a TOTP to the CDN for requesting a segment of streaming media. The TOTP from the streaming media device may be a representation of a combination of a modified time for the TOTP from the streaming media device and the TOTP from the authentication service. The CDN may verify the TOTP from the streaming media device to send the segment to the streaming media device.

36 Claims, 16 Drawing Sheets

TIME-BASED CLIENT-SIDE SIGNING OF CONTENT DELIVERY NETWORK UNIVERSAL RESOURCE IDENTIFIERS

BACKGROUND

Uniform resource identifier (URI) signing techniques seek to prevent unauthorized users from being able to access content over the Internet. URI signing is most often used in conjunction with a content delivery network (CDN), where potentially valuable data is stored and distributed. Typically, a trusted system signs URIs that are used to access the CDN, and the CDN only permits requests that have been signed. The trusted system and the CDN share a secret, which allows the CDN to verify that the signatures were created by the trusted system.

The trusted systems signing URIs are back-end systems, as client systems are inherently untrustworthy. Any signature that is created by a client system could be replicated by a hacker. However, back-end systems are not without problem. For example, one problem with back-end systems is that only one signature can be created at a time, and if more signatures are needed, clients must make additional requests to the back-end systems. This is especially problematic for streamed video content, which requires clients to fetch new data from CDNs every few seconds.

SUMMARY

Various aspects include methods for time-based signing of content delivery network (CDN) universal resource identifiers (URIs) implemented by a processing system. Aspects may include receiving a first time-based one-time password (TOTP) from an authentication service device, generating a second TOTP based on the first TOTP, and sending a first segment request with a first signing information including the second TOTP to a CDN.

In some aspects, generating the second TOTP based on the first TOTP may include combining a modified time and the first TOTP generating a combined modified time and first TOTP, and generating a representation of the combined modified time and first TOTP as the second TOTP. Some aspects may include modifying a current time generating the modified time.

Some aspects may include generating a third TOTP based on the first TOTP, and sending a second segment request with a second signing information including the third TOTP to the CDN. Some aspects may include determining that a TOTP regeneration criterion is met, in which generating the third TOTP based on the first TOTP may include generating the third TOTP based on the first TOTP in response to determining that the TOTP regeneration criterion is met, including modifying a current time generating a modified time, combining the modified time and the first TOTP generating a combined modified time and first TOTP, and generating a representation of the combined modified time and first TOTP as the second TOTP.

Some aspects may include sending a stream request to the authentication service device, in which receiving the first TOTP from the authentication service device may include receiving the first TOTP generated by the authentication service device in response to the stream request.

In some aspects, the first TOTP may include a representation of a combined modified time and secret key shared between the authentication service device and the CDN. In some aspects, the first signing information may further include a first modified time used for generating the first TOTP and a second modified time used for generating the second TOTP. Some aspects may include receiving a segment from the CDN in response to the CDN verifying the second TOTP.

Aspects may include generating a TOTP based on a modified time and a secret key shared with a CDN, and sending the TOTP to a streaming media device. In some aspects, generating the TOTP based on the modified time and the secret key shared with the CDN may include combining the modified time and the secret key shared with the CDN generating a combined modified time and secret key, and generating a representation of the combined modified time and secret key as the TOTP. Some aspects may include modifying a current time generating the modified time.

Some aspects may include receiving a stream request from the streaming media device, in which generating the TOTP based on the modified time and the secret key shared with the CDN may occur in response to receiving the stream request from the streaming media device. Some aspects may include sending the modified time to the streaming media device. Some aspects may include sharing the secret key with the CDN.

Aspects may include receiving, from a streaming media device, a segment request and a first TOTP generated by the streaming media device, verifying the first TOTP, and sending a segment to the streaming media device in response to verifying the first TOTP.

In some aspects, verifying the first TOTP may include generating a second TOTP, and verifying that the first TOTP and the second TOTP match. Some aspects may include receiving, from the streaming media device, a first modified time used for generating the first TOTP and a second modified time used for generating a third TOTP, and generating the third TOTP based on the second modified time and a secret key shared with an authentication service, in which generating the second TOTP may include generating the second TOTP based on the first modified time and the third TOTP.

In some aspects, generating the third TOTP based on the second modified time and the secret key shared with the authentication service, may include combining the second modified time and the secret key shared with the authentication service generating a combined second modified time and secret key, and generating a representation of the combined second modified time and secret key as the third TOTP. In some aspects, generating the second TOTP based on the first modified time and the third TOTP may include combining the first modified time and the third TOTP generating a combined first modified time and third TOTP, and generating a representation of the combined first modified time and third TOTP as the second TOTP.

Some aspects may include receiving, from the streaming media device, a first modified time used for generating the first TOTP and a second modified time used for generating a third TOTP, and verifying that the first modified time and the second modified time are valid, in which verifying the first TOTP may occur in response to verifying that the first modified time and the second modified time are valid.

Further aspects may include a computing device having a processing system configured to perform one or more operations of the methods summarized above. Further aspects may include a non-transitory processing system-readable storage medium having stored thereon processing system-executable instructions configured to cause a processing system of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Figure 1A:
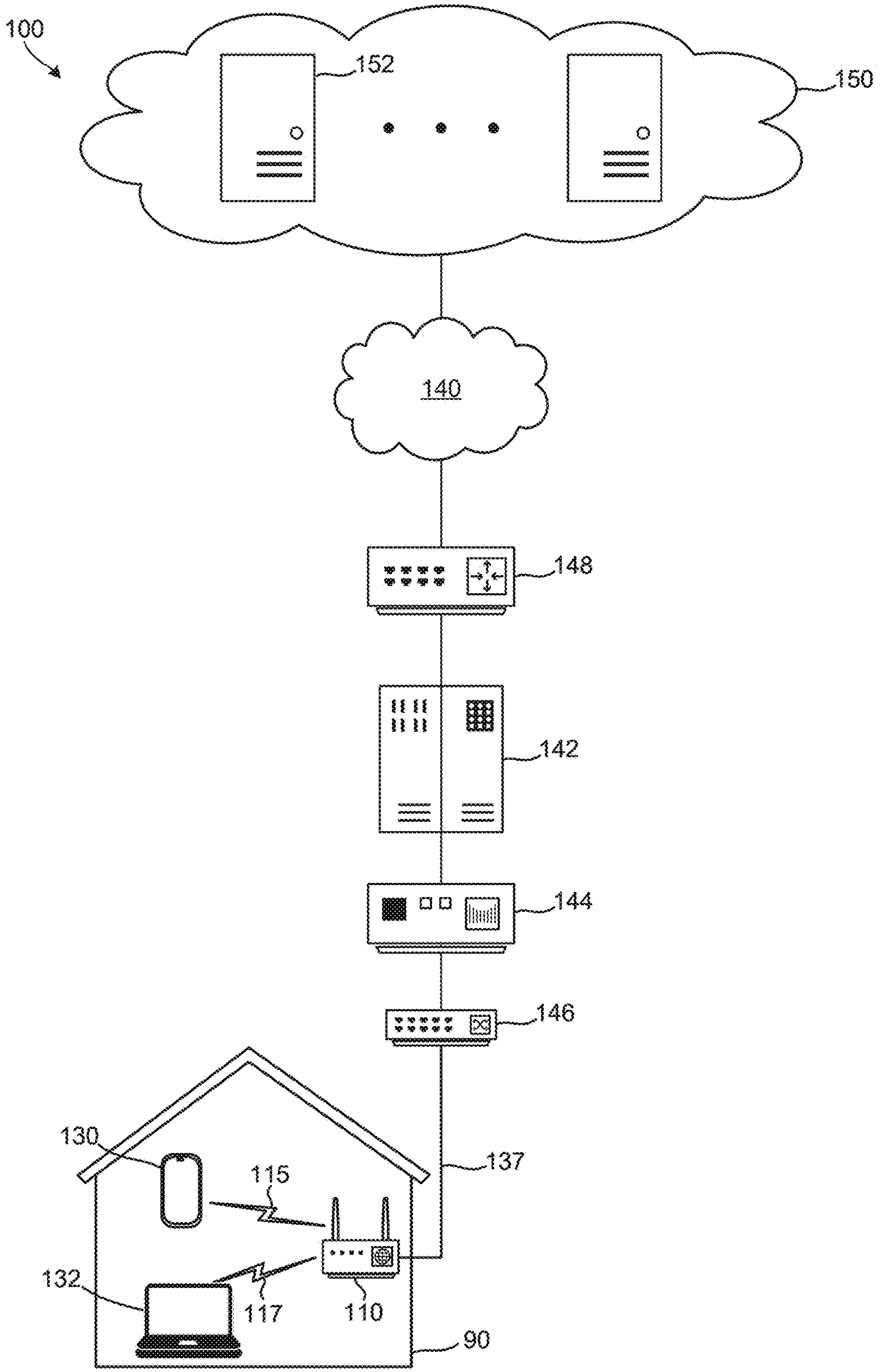
FIG. 1A is a schematic diagram conceptually illustrating an operational network in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include devices, systems, and methods for implementing time-based signing of content delivery network (CDN) universal resource identifiers (URIs). An authentication service may be configured to provide a time-based one-time password (TOTP) to a streaming media device that request content from the CDN. The TOTP from the authentication service may be a representation of a combination of a modified time for the TOTP and a secret key shared by the authentication service with a CDN. The streaming media device may be configured to provide a TOTP to the CDN for requesting a segment of streaming media (i.e., content). The TOTP from the streaming media device may be a representation of a combination of a modified time for the TOTP from the streaming media device and the TOTP from the authentication service. The CDN may verify the TOTP that is received from the streaming media device before sending the segment to the streaming media device. The CDN may generate a TOTP based on the modified time for the TOTP from the authentication service and the secret key shared by the authentication service to match the TOTP from the authentication service. The CDN may generate a TOTP based on the modified time for the TOTP from the streaming media device and the TOTP previously generated by the CDN. To verify the TOTP from the streaming media device, the CDN may match the TOTP from the streaming media device and the latter TOTP generated by the CDN.

URI signing is most often used in conjunction with a CDN, where potentially valuable data is stored and distributed. Typically, a trusted system signs URIs. The signed URIs are, in turn, used to access the CDN, and the CDN only permits requests that have a signed URI. The trusted system and the CDN share a secret, which allows the CDN to verify that the signatures were created by the trusted system.

Since client systems are inherently untrustworthy, the trusted systems signing URIs are back-end systems. Any signature that is created by a client system could be replicated by a hacker. However, a problem that arises with signing by the back-end systems is that only one signature can be created at a time, and if more signatures are needed, clients must make additional requests to the back-end systems. This is especially problematic for streamed video content, which requires clients to fetch new data from CDNs every few seconds. In instances in which back-end systems create signatures, it is trivial for hackers to capture and distribute the signatures for other people to use; the signatures are not tied to the client, and they expire infrequently.

Various embodiments disclosed herein may enable the creation of time-based rotating signatures that may be implemented on a client-side. The time-based rotating secret keys may allow signatures to be created on the client-side with little risk of secret leakage. In addition, by creating the signatures on the client-side, the level of effort required to replicate legitimate implementation of the clients may be increased, resulting in improved security. Various embodiments disclosed herein may enable new signatures to be created frequently, and for the signatures to have a very short time to live (TTL). The frequency of signature creation and length of TTL may be such that the possibility of humans manually stealing signatures is mitigated, as replicating the client code is the only way to realistically obtain a useful number of signatures. The signatures may be created using TOTPs, which regularly rotate.

Various embodiments disclosed herein may include a system of communication network connected client devices, such as streaming media devices, and remote devices, such as authentication service devices and CDN devices. A streaming media device may send a stream request to an authentication service device to commence streaming media, such as audio and video media, from a CDN. The authentication service device may respond to the stream request by generating an authentication service TOTP and sending the authentication service TOTP to the streaming media device. The authentication service TOTP may be generated by the authentication service device by modifying a current time generating a modified time for the authentication service TOTP, and combining the modified time with a secret key shared between the authentication service device and the CDN. The authentication service device may implement one or more operations on the combined modified time and secret key generating a representation of the combined modified time and secret key as the authentication service TOTP. The authentication service may send the authentication service TOTP and the modified time for the authentication service TOTP to the requesting streaming media device.

Using the authentication service TOTP and the modified time for the authentication service TOTP received from the authentication service, the streaming media device may generate a streaming media TOTP and send the streaming media TOTP to a CDN device along with a segment request for the streaming media. The streaming media TOTP may be generated by the streaming media device by modifying a current time generating a modified time for the streaming media TOTP, and combining the modified time with the authentication service TOTP. The streaming media device may implement one or more operations on the combined modified time and authentication service TOTP generating a representation of the combined modified time and authentication service TOTP as the streaming media TOTP. The streaming media device may send the streaming media TOTP, the modified time for the streaming media TOTP, and the modified time for the authentication service TOTP to the CDN device. The information sent by the streaming media device may be a streaming media device, or client-side, generated signature of a URI that directs the segment request to the CDN.

Using the streaming media TOTP, the modified time for the streaming media TOTP, and the modified time for the authentication service TOTP, the CDN device may verify the streaming media TOTP to identify whether to provide a requested segment of streaming media to the streaming media device. The CDN device may attempt to regenerate the streaming media TOTP. First, the CDN device may attempt to regenerate the authentication service TOTP from the modified time for the authentication service TOTP and the secret key shared with the authentication service. The CDN device may then use the modified time for the streaming media TOTP and the regenerated authentication service TOTP to attempt to regenerate the streaming media TOTP. The streaming media TOTP and the regenerated streaming media TOTP matching each other may verify the streaming media TOTP to the CDN. In response to verifying the streaming media TOTP, the CDN device may provide the requested segment of streaming media to the streaming media device.

As used herein, "network hardware" may refer to any hardware of a network. For example, network hardware may include hardware at a multi-system operator network cable-plant, headend, hub, node, etc. For further example, network hardware may include a channel modulator, a frequency multiplexer, an amplifier, a tap, a splitter, a modem, a cable management termination system, a switch, a router, a quadrature amplitude modulator, etc.

As used herein, the terms "computing device", "client device", and "client" are used interchangeably to refer to an electronic device equipped with at least a processor, communication systems, and memory. Computing devices may include, but are not limited to, any one or all of personal computers, portable computing devices, rack mounted computers, routers, modems, mobile devices, cellular telephones, smart phones, personal or mobile multi-media players, personal data assistants (PDAs), tablet computers, smart books, palm-top computers, desk-top computers, wireless electronic mail receivers, cellular telephones, gaming consoles, wireless gaming controllers, streaming media players (such as, ROKU®), DVRs, satellite or cable set top boxes, smart televisions, smart watches, smart buttons, smart appliances (such as refrigerators, ovens, washers and dryers, HVAC, water heaters, sprinklers, lighting fixtures and blubs, etc.), smart utility devices (such as water, electricity, and gas meters) smart speakers and assistants, smart home surveillance and security equipment (such as video doorbells, door locks, security video monitors, intrusion sensors, environmental sensors, etc.), smart home hubs, smart remote control devices (i.e., television remote controls with sufficient processing capabilities), smart cameras, smart pet accessories, voice over internet protocol (VOIP) telephones, printers, medical monitoring equipment and devices, embedded computers (such as in vehicles for infotainment, navigation, communication, etc.), Internet of Things (IoT) devices, and similar electronic devices which include a programmable processor and memory and circuitry for providing the functionality described herein.

The various embodiments are described herein using the term "server" and "server device" to refer to any computing device capable of functioning as a server and equipped with at least a processor, communication systems, and memory. A server may function as a communications server, a name server, a master exchange server, web server, mail server, document server, database server, route server, content server, a cloud server or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

Figure 1B:
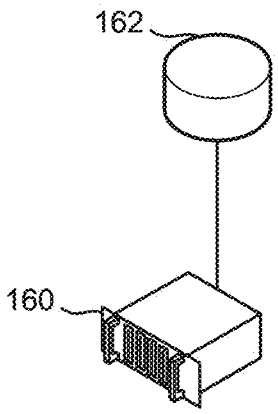
FIG. 1B is a schematic diagram conceptually illustrating an computing device in accordance with various embodiments.

FIGS. 1A and 1B illustrate an example of an operational network 100, such as an internet network, in accordance with various embodiments. With reference to FIGS. 1A and 1B, the operational network 100 may include various network hardware sites such as one or more headends 142, hubs 144, nodes 146, or other servers 148 any of which may be or be part of a cable-plant. Each of the network hardware sites 142, 144, 146, 148 may be configured to provide connectivity service between one or more modems 110 and a communication network 140 (e.g., the Internet). Each of the network hardware sites 142, 144, 146, 148 may include network hardware (not shown) to enable and control the connectivity service, such as a channel modulator, a frequency multiplexer, an amplifier, a tap, a splitter, a modem, a cable management termination system, a switch, a router, a quadrature amplitude modulator, etc. The modem 110, the network hardware sites 142, 144, 146, 148, and the communication network 140 may be coupled by one or more wired or wireless connections 137.

The communication network 140 may connect the network hardware sites 142, 144, 146, 148 to a content delivery network (CDN) 150, having one or more CDN servers 152. Media content, such as audio or video content, may be stored on the one or more CDN servers 152 and distributed via download or streaming, through live streaming, live linear streaming, or on demand download or streaming. Media content may be delivered to the modem 110 from the one or more CDN servers 152 via the communication network 140 and the hardware sites 142, 144, 146, 148.

Each of the network hardware sites 142, 144, 146, 148 and the one or more CDN servers 152 may be connected to remotely, such as via the communication network 140, and/or include locally a computing device 160, such as a server, and a data storage device 162 as illustrated in FIG. 1B. Any combination of the computing device 160 and the data storage device 162 may be located locally at and/or remotely to the network hardware sites 142, 144, 146, 148 and the one or more CDN servers 152. For example, both computing devices 160 and data storage devices 162 may be located locally at any of the network hardware sites 142, 144, 146, 148 or the one or more CDN servers 152. As another example, both the computing device 160 and the data storage device 162 may be located remotely from each of the network hardware sites 142, 144, 146, 148 and the one or more CDN servers 152. As yet another example, computing devices 160 may be located locally at and the data storage device 162 may be located remotely from any of the network hardware sites 142, 144, 146, 148 and the one or more CDN servers 152. The computing device 160 may include a processing system (not shown), such as one or more processors, processors, processor cores, controllers, microcontrollers, etc., configured to execute computer software. The data storage device 162 may be a non-volatile, processor system readable media (e.g., a magnetic, solid-state, optical, or tape, data storage device) configured to store the computer software for execution by the processing system of the computing device 160.

In some embodiments, the computer software stored by the data storage device 162 and executed by the processing system of the computing device 160 may be configured for implementing time-based client-side signing of CDN universal resource identifiers (URIs) as described further herein. For example, the computer software may include processor system executable instructions for implementing generating time-based one time passwords (TOTPs) and verifying TOTPs.

The computer software may be implemented by the processing system for the computing device 160 at one or more of the network hardware sites 142, 144, 146, 148 and the one or more CDN servers 152. In some embodiments, the computer software may be implemented and related data may be stored locally at and/or remotely to the network hardware sites 142, 144, 146, 148 and the one or more CDN servers 152 by the processing system for the computing device 160 and the data storage device 162 located locally at and/or remotely to the network hardware sites 142, 144, 146, 148 and the one or more CDN servers 152.

One or more modems 110 (which may include a router) may be located in one or more homes 90 or other building/area and connect a user computing device 130, 132 to the network hardware sites 142, 144, 146, 148, the communication network 140, and the one or more CDN servers 152. The modem 110 may be a network device that enables communication between networked devices, like one or more user computing devices 130, 132 and the network hardware sites 142, 144, 146, 148, the communication network 140, and the one or more CDN servers 152. The modem 110 may include the functionality of a router. Alternatively, the modem 110 may be connected to and work with a separate router that connects the user computing devices 130, 132 to the modem 110.

The user computing device 130, 132 may be any electronic device equipped with at least a processor, communication systems, and memory configured to transmit data between the user computing device 130, 132 and the network hardware sites 142, 144, 146, 148, the communication network 140, and the one or more CDN servers 152 via the modem 110. The user computing device 130, 132 may be coupled to the modem 110 by a short-range wireless connection 115, 117 (e.g., Wi-Fi, Bluetooth, etc.). The modem 110 may be coupled to the network hardware sites 142, 144, 146, 148, the communication network 140, or the one or more CDN servers 152 by one or more wired connections 137. The user computing device 130, 132 alternatively, or additionally, may be coupled to the network hardware sites 142, 144, 146, 148, the communication network 140, or the one or more CDN servers 152 by a long-range wireless connection (not shown).

In some embodiments, computer software stored by the memory and executed by the processor of the computing device 130, 132 may be configured for implementing time-based client-side signing of CDN URIs as described further herein. For example, the computer software may include processor system executable instructions for implementing generating TOTPs.

The communication links 137 may use a variety of wireless (e.g., 5g-NR(u), LTE, Citizens Broadband Radio Service (CBRS), etc.) and/or wired networks (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP). The communications links 137 may adhere to telecommunication standards, such as Data Over Cable Service Interface Specification (DOCSIS).

Figure 2:
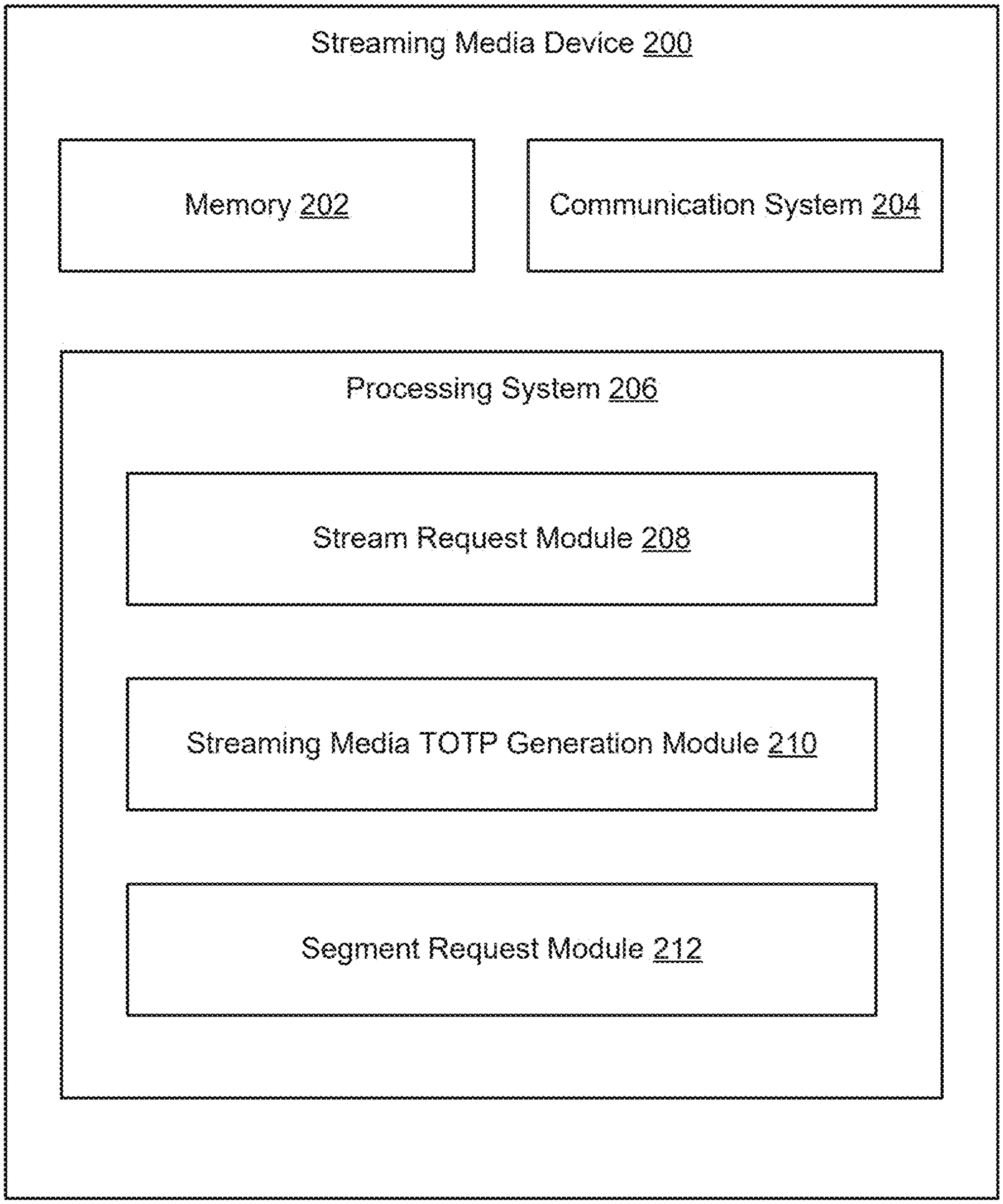
FIG. 2 is a block diagram illustrating a streaming media device having a processing system configured with executable modules in accordance with various embodiments.

FIG. 2 illustrates a streaming media device 200 having a processing system 206 configured with executable modules 208-212 in accordance with various embodiments. With reference to FIGS. 1A-2, the streaming media device 200 (e.g., computing device 130, 132 in FIG. 1A) may be configured to request and receive streaming media from a CDN 150. The streaming media device 200 may include the processing system 206 that may be configured with executable instructions for implementing the executable modules 208-212. The executable modules 208-212 may be stored on and accessed by the processing system 206 from a memory device 202 (e.g., data storage device 162 in FIG. 1B). The executable modules 208-212 may include functionality that may enable the streaming media device 200, via execution of the executable modules 208-212 by the processing system 206, to implement time-based client-side signing of CDN URIs as described further herein.

A stream request module 208 of the streaming media device 200 may be configured to generate and send requests for streaming media, or stream requests. A stream request may be prompted by a media application running on the streaming media device 200, such as an application for a streaming media platform or service or a web browser capable of playing streaming media via a website of a streaming media platform or service. The stream request may be for live(or linear live), or on demand streaming media. The stream request module 208 may direct the stream request to an authentication service of the streaming media platform or service via a communication system 204 of the streaming media device 200. A remote server (e.g., network hardware sites 142, 144, 146, 148, computing device 160 in FIGS. 1A and 1B) may implement the authentication service, and the communication system 204 may include a transceiver configured to communicate with a modem 110 enabling a connection between the streaming media device 200 and the authentication service.

The stream request module 208 may also be configured to receive responses to the stream request, or stream response, via the communication system 204. In response to a stream request received from the streaming media device, the authentication service may generate and send a stream response to the streaming media device 200, as described further herein. The stream response may include a TOTP generated by the authentication service, or authentication service TOTP, configured to be used to enable the streaming media device 200 to stream media from the CDN 150. In some embodiments, the stream response may also include a modified time used to generate the authentication service TOTP, or authentication service modified time, and configured to be used to enable the streaming media device 200 to stream media from the CDN 150. For example, the authentication service TOTP and/or the authentication service modified time may be used by the CDN 150 to verify the streaming media device 200 for a request for a segment of streaming media by the streaming media device 200, as described further herein. The stream request module 208 may provide the authentication service TOTP and/or the authentication service modified time to a streaming media TOTP generation module 210 of the streaming media device 200.

The stream response may also include a uniform resource identifier (URI) configured to indicate a location of the requested streaming media on the CDN 150. The stream request module 208 may provide the URI to a segment request module 212 of the streaming media device 200. In some embodiments, the stream request module 208 may provide the authentication service modified time to the segment request module 212.

The streaming media TOTP generation module 210 may be configured to generate a TOTP, or streaming media TOTP, configured to be used to enable the streaming media device 200 to stream media from the CDN 150. The streaming media TOTP may be generated based on the authentication service TOTP received from the stream request module 208.

For example, the streaming media TOTP may be generated based on a combination of a modified time for generating the streaming media TOTP, or streaming media modified time, and the authentication service TOTP. The streaming media modified time may be generated by the streaming media TOTP generation module 210 by modifying a time for generating the streaming media TOTP. The time for generating the streaming media TOTP may be a current time of approximately the time the streaming media TOTP is generated, such as a time approximately between the time the authentication service TOTP is received by the stream request module 208 and the time the streaming media TOTP is generated. In some embodiments, the current time may be based on a local time of the streaming media device 200, such as a time of an operating system of the streaming media device 200. In some embodiments, the current time may be based on a remote time from a remote server (e.g., network hardware sites 142, 144, 146, 148, computing device 160 in FIGS. 1A and 1B). In some embodiments the current time may be expressed in coordinated universal time (UTC). In some embodiments, the current time may be expressed in hours, minutes, and/or seconds.

The streaming media modified time may be generated by the streaming media TOTP generation module 210 by modifying the time for generating the streaming media TOTP, or the current time, to a specified time period. For example, the time period may be expressed by a designated period of second, minutes, hours, days, etc. The current time may be modified to correspond with the specified time period. The current time may be modified by implementing one or more operations on the current time so that the current time is modified to correspond with the specified time period. For a non-limiting example, the current time may be rounded up or down to correspond with the specified time period. The specified time period may be configured as a period of validity of the streaming media TOTP. For example, a specified time period of a number of seconds, such as any number of seconds between approximately 1 to 60 seconds, including approximately 30 seconds, from the current time and may enable the streaming media TOTP to remain valid, or not expired, for the specified time period.

The streaming media modified time and the authentication service TOTP may be combined by the streaming media TOTP generation module 210 by implementing one or more operations or algorithms on the streaming media modified time and the authentication service TOTP. Combination of the streaming media modified time and the authentication service TOTP may be implemented in various manners resulting in any type of combination of the streaming media modified time and the authentication service TOTP. For example, characters of the streaming media modified time and the authentication service TOTP may be joined serially in any order, individual or groups of characters of the streaming media modified time and the authentication service TOTP may be interleaved in any order, operations may be implemented on individual or groups of characters of the streaming media modified time and the authentication service TOTP resulting in one or more outputs grouped in any order, etc. For a non-limiting example, the characters of the streaming media modified time may follow sequentially the characters of the authentication service TOTP without any spacing between the characters. The combination of the streaming media modified time and the authentication service TOTP may be referred to as a combined modified time and authentication service TOTP or similar.

A representation of the combined modified time and authentication service TOTP may be generated by the streaming media TOTP generation module 210 as a streaming media TOTP. One or more operations or algorithms may be implemented using the combined modified time and authentication service TOTP to generate a representation of the combined modified time and authentication service TOTP. The representation of the combined modified time and authentication service TOTP may be the result of the one or more operations or algorithms such that the representation of the combined modified time and authentication service TOTP is different from the combined modified time and authentication service TOTP. For a non-limiting example, the streaming media TOTP generation module 210 may implement a hashing function, such as SHA-256, to generate the representation of the combined modified time and authentication service TOTP. The representation of the combined modified time and authentication service TOTP may be a streaming media TOTP that the streaming media TOTP generation module 210 may provide to the segment request module 212. In some embodiments, the streaming media TOTP generation module 210 may also provide the streaming media modified time to the segment request module 212.

The segment request module 212 may be configured to generate and send, via the communication system 204, a segment request to a CDN 150 for a segment of streaming media. The segment request may include URI signing information including the URI for the streaming media requested by the streaming media device 200 and the streaming media TOTP. In some embodiments, the URI signing information may include the streaming media modified time and/or the authentication service modified time.

In some embodiments, the streaming media TOTP generation module 210 may generate a streaming media TOTP for a session for the streaming media. In some embodiments, the streaming media TOTP generation module 210 may continuously, periodically, or episodically generate streaming media TOTPs for a session for the streaming media. In an embodiment, the streaming media TOTP generation module 210 may generate a streaming media TOTP for each one or more segment requests for the streaming media. In another embodiment, the streaming media TOTP generation module 210 may generate a streaming media TOTP based on a validity of the streaming media modified time. The streaming media modified time may be valid for as long as the specified time period used to generate the streaming media modified time. A lapse of the specified time period may prompt the streaming media TOTP generation module 210 to generate a successive streaming media TOTP based on a successive streaming media modified time and the authentication service TOTP. The streaming media TOTP generation module 210 may provide a successive streaming media TOTP to the segment generation module 212. The segment generation module 212 may use the successive streaming media TOTP in generating and sending segment requests for the streaming media.

Figure 3:
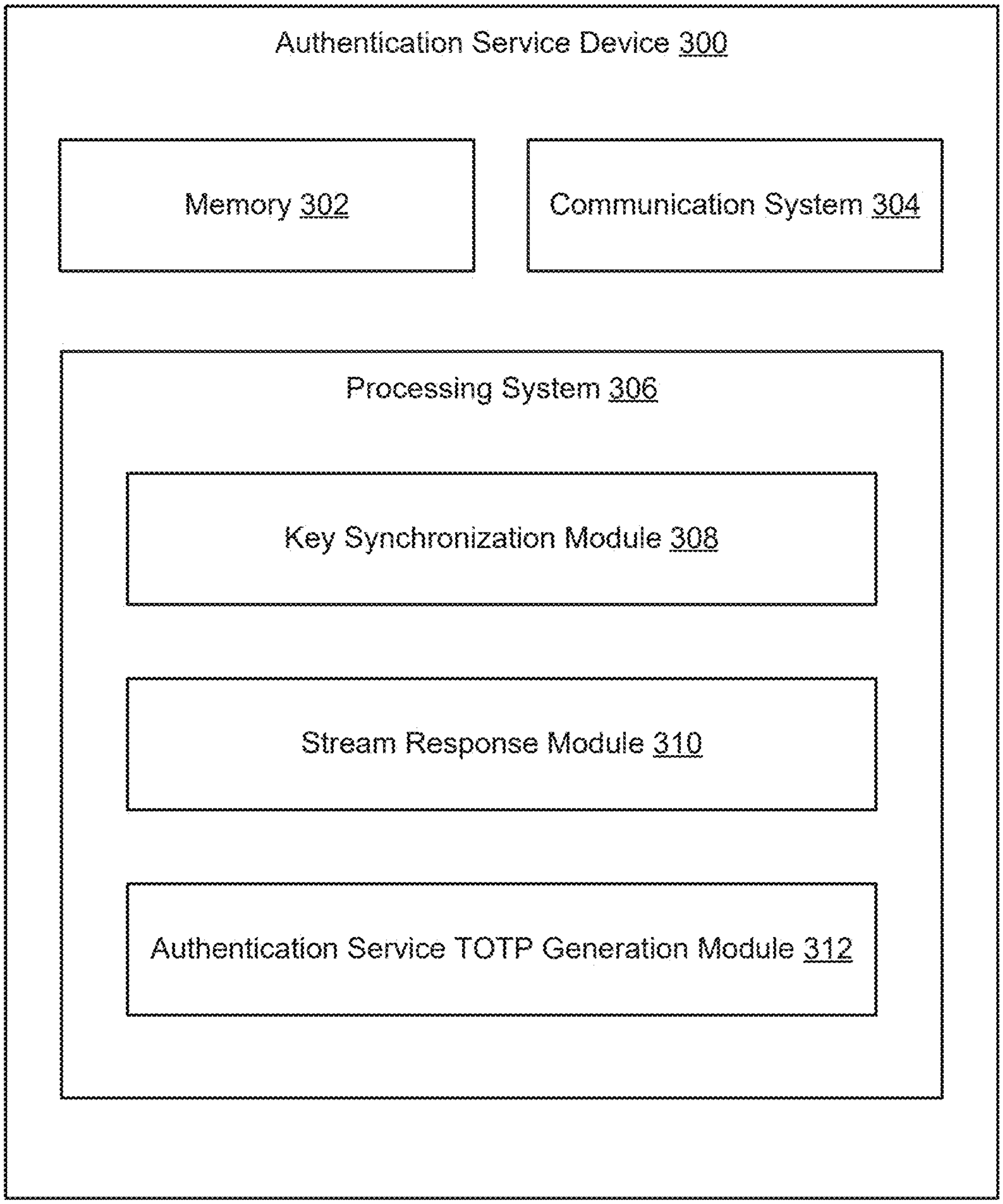
FIG. 3 is a block diagram illustrating an authentication service device having a processing system configured with executable modules in accordance with various embodiments.

FIG. 3 illustrates an authentication service device 300 having a processing system 306 configured with executable modules 308-312 in accordance with various embodiments. With reference to FIGS. 1A-3, the authentication service device 300 (e.g., network hardware sites 142, 144, 146, 148, computing device 160 in FIGS. 1A and 1B) may be configured to authenticate a streaming media device 200 for streaming media from a CDN 150. The authentication service device 300 may include the processing system 306 that may be configured with executable instructions for implementing the executable modules 308-312. The executable modules 308-312 may be stored on and accessed by the processing system 306 from a memory device 302 (e.g., data storage device 162 in FIG. 1B). The executable modules 308-312 may include functionality that may enable the authentication service device 300, via execution of the executable modules 308-312 by the processing system 306, to implement time-based client-side signing of CDN URIs as described further herein.

A key synchronization module 308 of the authentication service device 300 may be configured to share a secret key with the CDN 150 via a communication system 304 of the authentication service device 300. The secret key may be used by the authentication service device 300 to generate an authentication service TOTP and by the CDN 150 to verify a streaming media TOTP. The secret key may be a static secret key that does not change or changes infrequently, or a dynamic secret key, such as rotating secret key that may change continuously, periodically, or episodically. In some embodiments, the key synchronization module 308 may algorithmically generate the secret key or select the secret key from a set of available secret keys and send the secret key to the CDN 150. In some embodiments, key synchronization module 308 may send one or more parameters for generating or selecting a secret key to the CDN 150 and the key synchronization module 308 and the CDN 150 may individually generate or select the secret key. The key synchronization module 308 may also provide the secret key to an authentication service TOTP generation module 312 of the authentication service device 300.

A stream response module 310 of the authentication service device 300 may be configured to receive stream requests from and respond to the streaming media requests from the streaming media device 200 via the communication system 304. The stream response module 310 may be configured to authenticate that the streaming media device 200 may stream requested media via the streaming media service or platform by any of various known processes. In some embodiments, the stream response module 310 may be configured to authenticate that a user of the streaming media device 200 may stream requested media via the streaming media service or platform. For the authenticated streaming media device 200, the stream response module 310 may prompt the authentication service TOTP generation module 312 to generate an authentication service TOTP.

The authentication service TOTP generation module 312 may be configured to generate a TOTP, or authentication service TOTP, configured to be used to enable the streaming media device 200 to stream media from the CDN 150. The authentication service TOTP may be generated based on the secret key shared between the authentication service device 300 and the CDN 150.

In an embodiment, the authentication service TOTP may be generated based on a combination of a modified time for generating the authentication service TOTP, or authentication service modified time, and the secret key. The authentication service modified time may be generated by the authentication service TOTP generation module 312 by modifying a time for generating the authentication service TOTP. The time for generating the authentication service TOTP may be a current time of approximately when the authentication service TOTP is generated, such as a time approximately between when the stream response module 310 prompts the authentication service TOTP generation module 312 and when the authentication service TOTP is generated. In some embodiments, the current time may be based on a local time of the authentication service device 300, such as a time of an operating system of the authentication service device 300. In some embodiments, the current time may be based on a remote time from a remote server (e.g., network hardware sites 142, 144, 146, 148, computing device 160 in FIGS. 1A and 1B). In some embodiments the current time may be expressed in coordinated universal time (UTC). In some embodiments, the current time may be expressed in hours, minutes, and/or seconds.

The authentication service modified time may be generated by the authentication service TOTP generation module 312 by modifying the time for generating the authentication service TOTP, or the current time, to a specified time period. For example, the time period may be expressed by a designated period of second, minutes, hours, days, etc. The current time may be modified to correspond with the specified time period. The current time may be modified by implementing one or more operations on the current time so that the current time is modified to correspond with the specified time period. For a non-limiting example, the current time may be rounded up or down to correspond with the specified time period. The specified time period may be configured as a period of validity of the authentication service TOTP. For example, a specified time period of a number of days, such as any number of days between approximately 1 to 7 days, including approximately 2 days, from the current time and may enable the authentication service TOTP to remain valid, or not expired, for the specified time period.

The authentication service modified time and the secret key may be combined by the authentication service TOTP generation module 312 by implementing one or more operations or algorithms on the authentication service modified time and the secret key. Combination of the authentication service modified time and the secret key may be implemented in various manners resulting in any type of combination of the authentication service modified time and the secret key. For example, characters of the authentication service modified time and the secret key may be joined serially in any order, individual or groups of characters of the authentication service modified time and the secret key may be interleaved in any order, operations may be implemented on individual or groups of characters of the authentication service modified time and the secret key resulting in one or more outputs grouped in any order, etc. For a non-limiting example, the characters of the authentication service modified time may follow sequentially the characters of the secret key without any spacing between the characters. The combination of the authentication service modified time and the secret key may be referred to as a combined modified time and secret key or similar.

A representation of the combined modified time and secret key may be generated by the authentication service TOTP generation module 312 as an authentication service TOTP. One or more operations or algorithms may be implemented using the combined modified time and secret key to generate a representation of the combined modified time and secret key. The representation of the combined modified time and secret key may be the result of the one or more operations or algorithms such that the representation of the combined modified time and secret key is different from the combined modified time and secret key. For a non-limiting example, the authentication service TOTP generation module 312 may implement a hashing function, such as SHA-256, to generate the representation of the combined modified time and secret key. The representation of the combined modified time and secret key may be an authentication service TOTP that the authentication service TOTP generation module 312 may provide to the stream response module 310. In some embodiments, the authentication service TOTP generation module 312 may also provide the authentication service modified time to the stream response module 310.

The stream response module 310 may generate and send, via the communication system 304, a response to the stream request, or stream response, from the streaming media device 200. The stream response module 310 may receive the authentication service TOTP from the authentication service TOTP generation module 312 and include the authentication service TOTP as part of the stream response. In some embodiments, the stream response module 310 may receive the authentication service modified time from the authentication service TOTP generation module 312 and also include the authentication service TOTP as part of the stream response.

Figure 4:
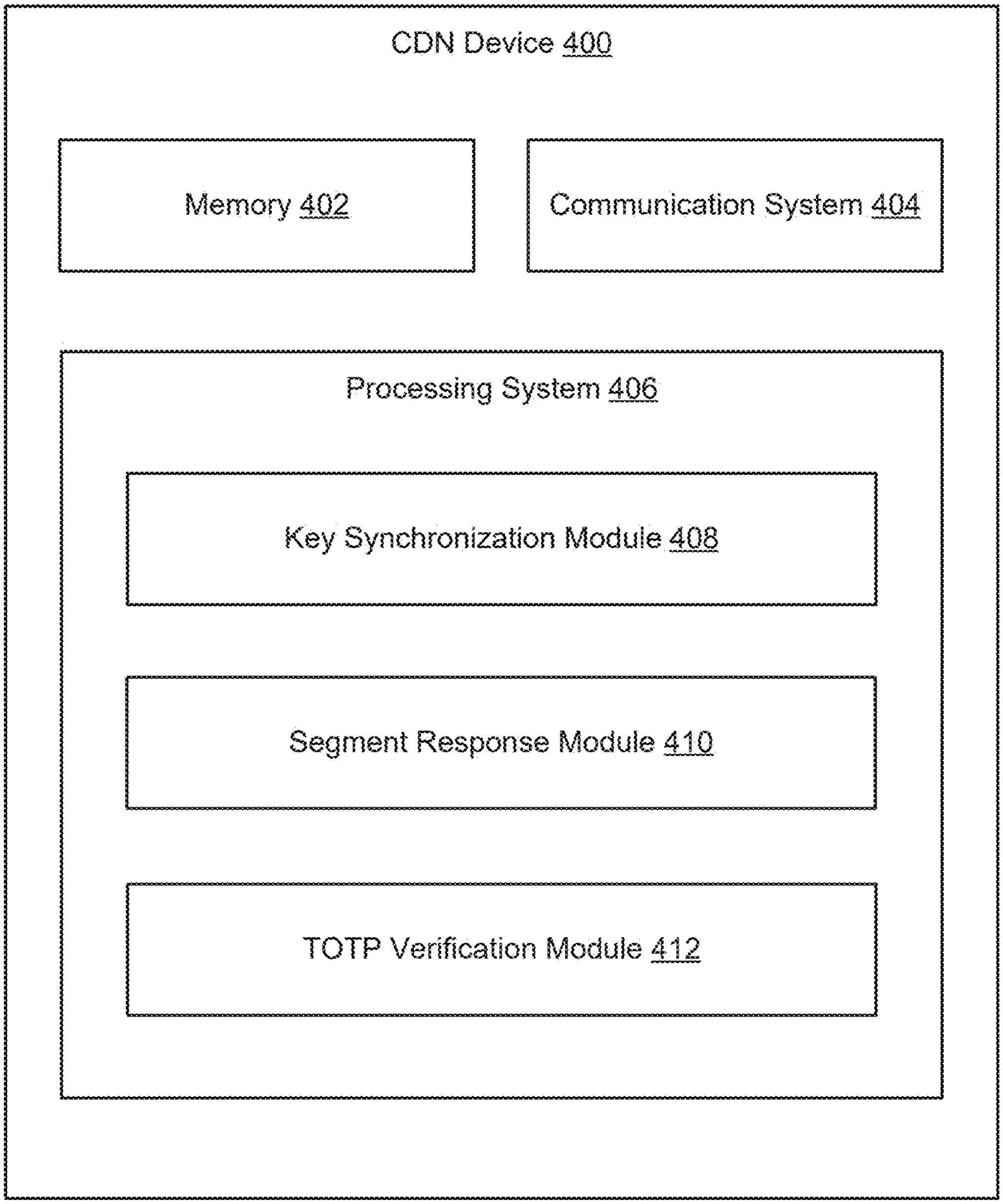
FIG. 4 is a block diagram illustrating a content delivery network (CDN) device having a processing system configured with executable modules in accordance with various embodiments.

FIG. 4 illustrates an CDN device 400 having a processing system 406 configured with executable modules 408-412 in accordance with various embodiments. With reference to FIGS. 1A-4, the CDN device 400 (e.g., CDN server 152, computing device 160 in FIGS. 1A and 1B) may be configured to enable a streaming media device 200 to stream media from a CDN 150. The CDN device 400 may include the processing system 406 that may be configured with executable instructions for implementing the executable modules 408-412. The executable modules 408-412 may be stored on and accessed by the processing system 406 from a memory device 402 (e.g., data storage device 162 in FIG. 1B). The executable modules 408-412 may include functionality that may enable the CDN device 400, via execution of the executable modules 408-412 by the processing system 406, to implement time-based client-side signing of CDN URIs as described further herein.

A key synchronization module 408 of the CDN device 400 may be configured to share a secret key with the authentication service device 300 via a communication system 404 of the CDN device 400. The secret key may be used by the authentication service device 300 to generate an authentication service TOTP and by the CDN device 400 to verify a streaming media TOTP. The secret key may be a static secret key that does not change or changes infrequently, or a dynamic secret key, such as rotating secret key that may change continuously, periodically, or episodically. In some embodiments, the key synchronization module 408 may receive the secret key from the authentication service device 300. In some embodiments, key synchronization module 408 receive one or more parameters for generating or selecting a secret key from the authentication service device 300 and the key synchronization module 408 may generate or select the secret key based on the one or more parameters. The key synchronization module 408 may also provide the secret key to an TOTP verification module 412 of the CDN device 400.

A segment response module 410 of the CDN device 400 may receive and respond to segment requests for streaming media from a streaming media device 200 via the communication system 404. A segment request may be directed to the CDN device 400 via the communication network 140 according to a URI of the segment request. The segment request may include a streaming media TOTP. The segment response module 410 may provide the streaming media TOTP to the TOTP verification module 412. In some embodiments, the segment request may include a streaming media modified time and/or an authentication service modified time. The segment response module 410 may provide the streaming media modified time and/or the authentication service modified time to the TOTP verification module 412.

The TOTP verification module 412 may be configured to verify the streaming media TOTP to enable the segment response module 410 to provide the streaming media to the streaming media device 200 in response to the segment request. The TOTP verification module 412 may be configured to verify the streaming media TOTP by various means. For example, the TOTP verification module 412 may use the secret key to verify the streaming media TOTP based on rotating secret key techniques, such as recreating the streaming media TOTP using various current or prior secret keys.

For another example, the TOTP verification module 412 may use the secret key, the streaming media modified time, and the authentication service modified time to verify the streaming media TOTP. The TOTP verification module 412 may regenerate the authentication service TOTP in a similar manner as the authentication service TOTP generation module 312 of the authentication service device 300. The authentication service TOTP may be regenerated based on the secret key and the authentication service modified time from the segment request. The TOTP verification module 412 may regenerate the streaming media TOTP in a similar manner as the streaming media TOTP generation module 212 of the streaming media device 200. The streaming media TOTP may be regenerated based on the regenerated authentication service TOTP and the streaming media modified time from the segment request. Matching the streaming media TOTP from the segment request and the regenerated streaming media TOTP may result in verification of the streaming media device 200 requesting the segment of the streaming media.

In some embodiments, the TOTP verification module 412 may determine whether the streaming media TOTP from the segment request is expired. Determining expiration of the streaming media TOTP may be implemented prior to other aspects of verification of the streaming media TOTP, such a regeneration of the authentication service TOTP or the streaming media TOTP. Whether the authentication service modified time and/or the streaming media modified time are valid, or not expired, may be based on various criteria, such as times or dates or expiration or length of a validity period. Verification of the streaming media TOTP may continue for a valid authentication service modified time and/or valid streaming media modified time.

For a verified streaming media TOTP, the TOTP verification module 412 may prompt the segment response module 410 to provide a segment of the requested streaming media to the streaming media device 200 in response to the segment request. The segment response module 410 may retrieve the segment of the streaming media and provide the segment to the streaming media device 200 via the communication system 404.

The executable modules 208-212, 308-312, 408-412 are meant to be illustrative and do not limit to the scope of the description or claims to the example number, organization, or configuration of the executable modules 208-212, 308-312, 408-412. One of skill in the art would recognize that the executable modules 208-212, 308-312, 408-412 may be combined or divided into other combinations of executable modules configured to implement the same or like functions.

Figure 5A:
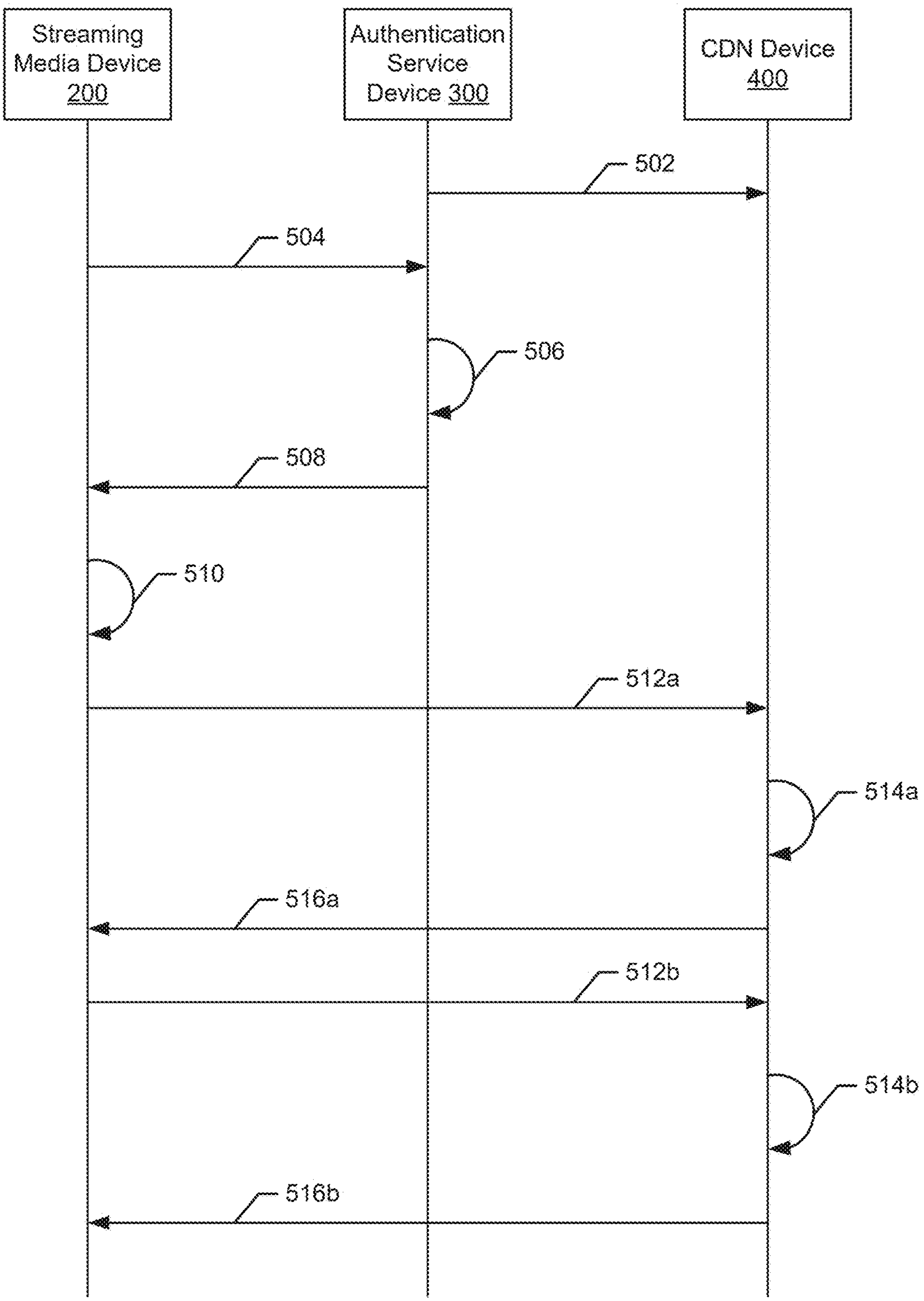
FIGS. 5A and 5B are block and signaling diagrams illustrating time-based client-side signing of CDN universal resource identifiers (URIs) in accordance with various embodiments.
Figure 5B:
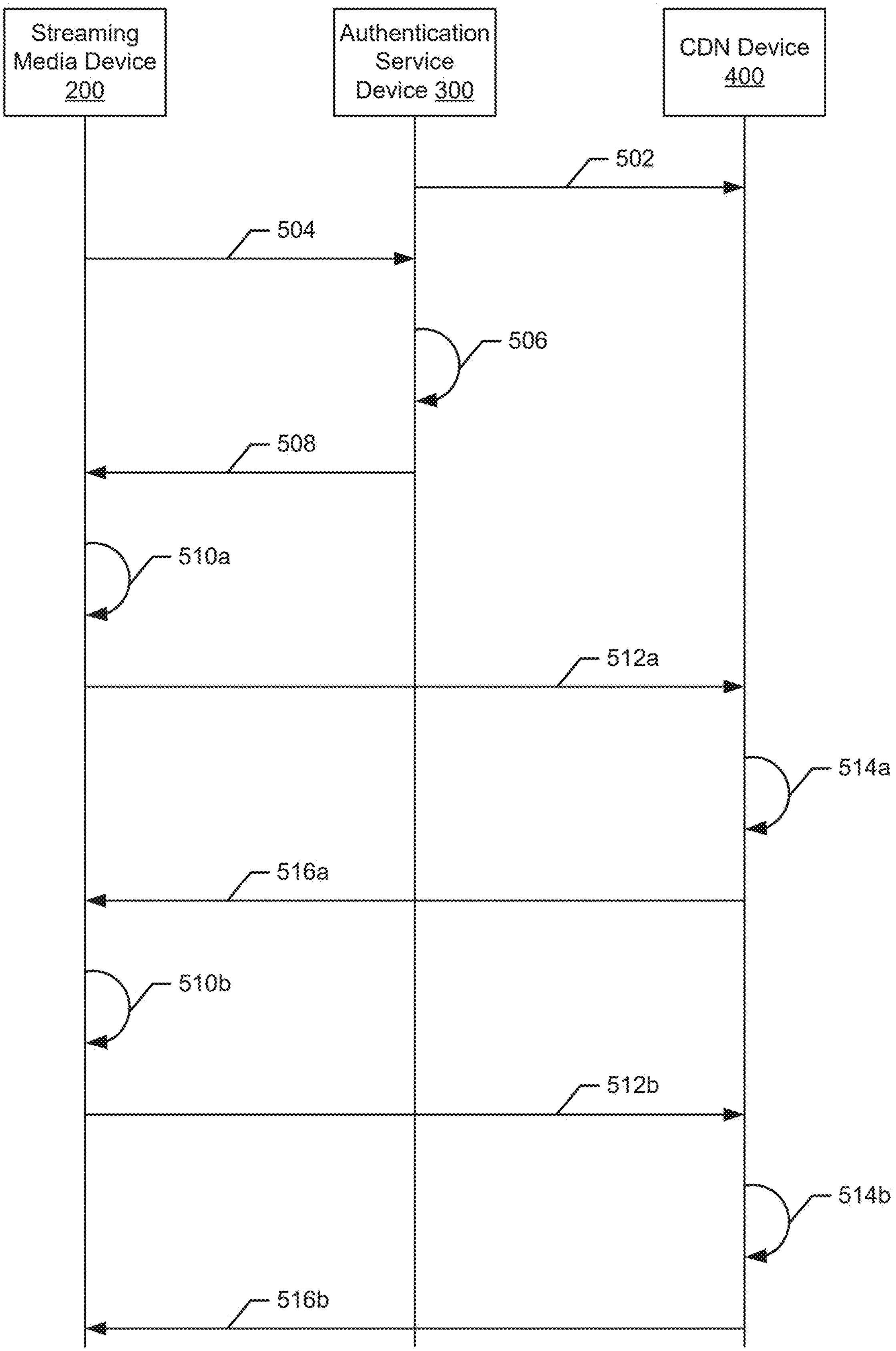

FIGS. 5A and 5B illustrate processes and signaling of an operational network 100 implementing time-based client-side signing of CDN URIs in accordance with various embodiments. With reference to FIGS. 1A-5B, the operational network 100 may include the streaming media device 200, the authentication service device 300, and the CDN device 400. Each of the devices 200, 300, 400 may be configured with processing systems and memories 202, 302, 304 configured to execute and store processing system-executable instructions (e.g., executable modules 208-212, 308-312, 408-412 in FIGS. 2-3) for implementing the processes and signaling. Each of the devices 200, 300, 400 may also include communication systems 204, 304, 404 configured to receive and transmit signals between the devices 200, 300, 400.

In the examples illustrated in FIGS. 5A and 5B, the authentication service device 300 and the CDN device 400 may share a secret key via a signal 502. For example, the authentication service device 300 may send the CDN device 400 a secret key. For another example, the authentication service device 300 may send the CDN device 400 a parameter for algorithmically generating a secret key or selecting a secret key from a set of secret keys. The shared secret key may be configured such that the secret key at the CDN device 400 matches the secret key at the authentication service device 300.

The streaming media device 200 may send a stream request to the authentication service device 300 via a signal 504. The stream request may include information that may enable the authentication service device 300 to authenticate the streaming media device 200 requesting streaming media and/or a user of the streaming media device 200 requesting the streaming media. For example, the stream request may identify the streaming media device 200, the user of the streaming media device 200, the streaming media platform or service from which the streaming media is requested, and/or the requested streaming media.

The authentication service device 300 may authenticate the streaming media device 200 and/or the user of the streaming media device 200 requesting the streaming media and generate a response to the stream request, or stream response, via process 506. The streaming media device 200 and/or user of the streaming media device 200 may be authenticated via various known processes. In response to authenticating the streaming media device 200 and/or user of the streaming media device 200, the authentication service device 300 may generate an authentication service TOTP.

For example, the authentication service device 300 may generate an authentication service modified time for generating the authentication service TOTP from a current time. The authentication service device 300 may combine the secret key and the authentication service modified time, generating a combined modified time and secret key, and generate a representation of the combined modified time and secret key as the authentication service TOTP. For example, modifying the current time may include rounding the current time to a specified time period generating the authentication service modified time. Combining the secret key and the authentication service modified time may include implementing operations such that the characters of the secret key and the characters of the authentication service modified time are grouped sequentially and without spacing. Generating the representation of the combined modified time and secret key may include implementing a hash function, such as SHA-256, for the combined modified time and secret key.

The authentication service device 300 may generate and send the response to stream request to the streaming media device 200 via signal 508. The stream response may include the authentication service TOTP. In some embodiments, the stream response may also include the authentication service modified time.

The streaming media device 200 may use the stream response to generate a streaming media TOTP via process 510. For example, the streaming media device 200 may generate a streaming media modified time for generating the streaming media TOTP from a current time. The streaming media device 200 may combine the authentication service TOTP and the streaming media modified time, generating a combined modified time and authentication service TOTP, and generate a representation of the combined modified time and authentication service TOTP as the streaming media TOTP. For example, modifying the current time may include rounding the current time to a specified time period generating the streaming media modified time. Combining the authentication service TOTP and the streaming media modified time may include implementing operations such that the characters of the authentication service TOTP and the characters of the streaming media modified time are grouped sequentially and without spacing. Generating the representation of the combined modified time and authentication service TOTP may include implementing a hash function, such as SHA-256, for the combined modified time and authentication service TOTP.

The streaming media device 200 may generate and send a segment request for streaming media to the CDN device 400 via signal 512*a*. The segment request may include URI signing information including a URI for streaming media of which a segment is requested via the segment request. The URI may be used by the operational network 100 to direct the segment request to the CDN device 400 configured to provide the streaming media to the streaming media device 200. The URI signing information may also include the streaming media TOTP that the CDN device 400 may verify to enable the CDN device to respond to the segment request by sending a segment of the requested streaming media to the streaming media device 200. In some embodiments, the URI signing information may also include the streaming media modified time and/or the authentication service modified time used in generating the streaming media TOTP.

The CDN device 400 may verify the streaming media TOTP via process 514*a*. For example, the CDN device 400 may use the secret key and the authentication service modified time to regenerate the authentication service TOTP in a manner similar to how the authentication service device 300 generates the authentication service TOTP via process 506. The CDN device 400 may use the regenerated authentication service TOTP and the streaming media modified time to regenerate the streaming media TOTP in a manner similar to how the streaming media device 200 generates the streaming media TOTP via process 510*a*. The CDN device 400 may compare the streaming media TOTP received with the segment request and the regenerated streaming media TOTP. Matching streaming media TOTPs may verify the received streaming media TOTP and enable the CDN device 400 to send a segment of the requested streaming media to the streaming media device 200.

In some embodiments, to verify the streaming media TOTP, the CDN device 400 may determine that the streaming media TOTP is valid, or not expired, based on the authentication service modified time and/or the streaming media modified time. The CDN device 400 may determine whether the authentication service modified time and/or the streaming media modified time are valid, or not expired, based on various criteria, such as times or dates or expiration or length of a validity period. For a valid the authentication service modified time and/or the streaming media modified time, the streaming media TOTP may be valid. A valid streaming media TOTP may be verified by the CDN device 400.

The CDN device 400 may generate and send a segment response to the streaming media device 200 via signal 516*a* in response to verifying the streaming media TOTP via process 514*a*. The segment response may include a segment of the streaming media requested by the streaming media device in the segment request.

With reference to the example illustrated in FIG. 5A, the streaming media TOTP may remain valid for subsequent segment requests for the streaming media. For example, while the streaming media device 200 continues to request segments of the streaming media the streaming media TOTP may remain valid. The streaming media device 200 and the CDN device 300 may repeat implementing the signal 512*b* requesting a segment of the streaming media with the streaming media TOTP; the process 514*b* verifying the streaming media TOTP; and the signal 516*b* providing a segment of the streaming media in response to verifying the streaming media TOTP.

With reference to the example illustrated in FIG. 5B, an added layer of security may be implemented by reducing a validity period for the streaming media TOTP so that multiple streaming media TOTPs may be used for subsequent segment requests for the streaming media. To continue successfully requesting segments of the streaming media, the streaming media device 200 may continually, periodically, or episodically generate subsequent streaming media TOTPs. For example, the streaming media device may generate subsequent streaming media TOTPs for each segment request. For another example, the streaming media device may generate subsequent streaming media TOTPs following expiration of a validity period for the streaming media TOTP, such as a number of seconds or minutes. For example, while the streaming media device 200 continues to request segments of the streaming media the streaming media TOTP may expire. The streaming media device 200 may repeat process 510*b* by validating the prior streaming media TOTP and generating a subsequent streaming media TOTP in response to the prior streaming media TOTP being invalid. In response to the prior streaming media TOTP being valid, the streaming media device 200 and the CDN device 300 may repeat implementing the signal 512*b* requesting a segment of the streaming media with the prior streaming media TOTP; the process 514*b* verifying the prior streaming media TOTP; and the signal 516*b* providing a segment of the streaming media in response to verifying the streaming media TOTP. In response to the prior streaming media TOTP being invalid, the streaming media device 200 and the CDN device 300 may repeat implementing the signal 512*b* requesting a segment of the streaming media with the subsequent streaming media TOTP; the process 514*b* verifying the subsequent streaming media TOTP; and the signal 516*b* providing a segment of the streaming media in response to verifying the streaming media TOTP.

FIGS. 6A, 6B, 7A, 7B, 8A and 8B illustrate embodiment methods 600*a*, 600*b*, 700*a*, 700*b*, 800*a* and 800*b* descriptions of which presented below are intended to be illustrative. In some embodiments, the methods 600*a*, 600*b*, 700*a*, 700*b*, 800*a* and 800*b* may be accomplished with one or more additional operations not described, and/or without one or more of the operations discussed. Additionally, the order in which the operations of methods 600*a*, 600*b*, 700*a*, 700*b*, 800*a* and 800*b* are illustrated in FIGS. 6A, 6B, 7A, 7B, 8A and 8B and described below is not intended to be limiting.

In some embodiment, methods 600*a*, 600*b*, 700*a*, 700*b*, 800*a* and 800*b* may be implemented in a processing system (e.g., processing system 206, 306, 406 in FIGS. 2-4), having one or more processors, in conjunction with memory (e.g., data storage device 162, memory 202, 302, 402 in FIGS. 1B-4). The processing system may include one or more device(s) executing some or all of the operations of the methods 600*a*, 600*b*, 700*a*, 700*b*, 800*a* and 800*b* in response to instructions (e.g., executable modules 208-212, 308-312, 408-412 in FIGS. 2-4) stored electronically on an electronic storage medium (e.g., data storage device 162, memory 202, 302, 402 in FIGS. 1B-4). The processing system may include one or more devices configured through hardware, firmware, and/or software to be specifically designed for execution of one or more of the operations of the methods 600*a*, 600*b*, 700*a*, 700*b*, 800*a* and 800*b*. For example, with reference to FIGS. 1A-8B, the operations of the methods 600*a*, 600*b*, 700*a*, 700*b*, 800*a* and 800*b* may be performed by the processing system of a computing device (e.g., computing device 160, streaming media device 200, authentication service device 300, CDN device 400 in FIGS. 1B-4).

Figure 6A:
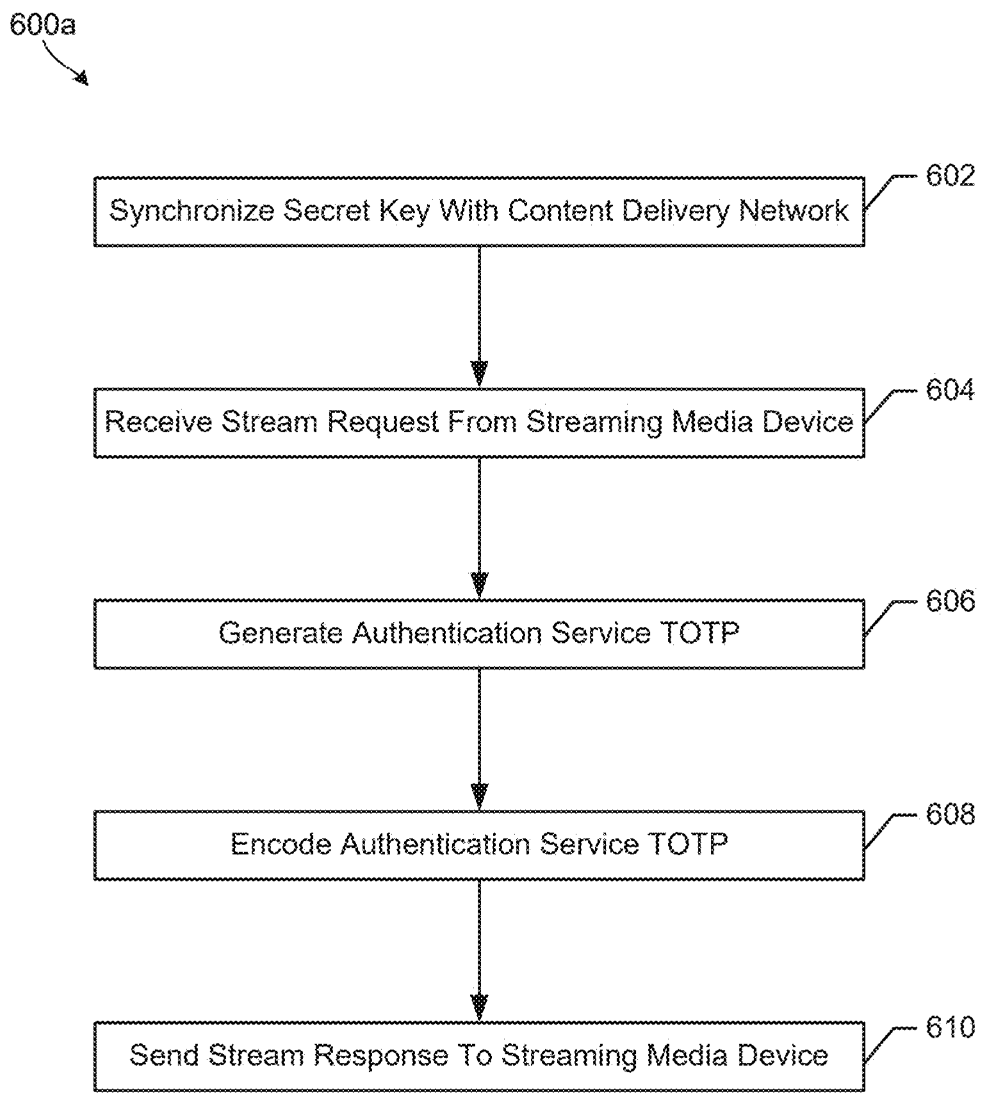
FIGS. 6A and 6B are process flow diagrams illustrating embodiment methods for implementing time-based client-side signing of CDN URIs suitable for use with various embodiments.
Figure 6B:
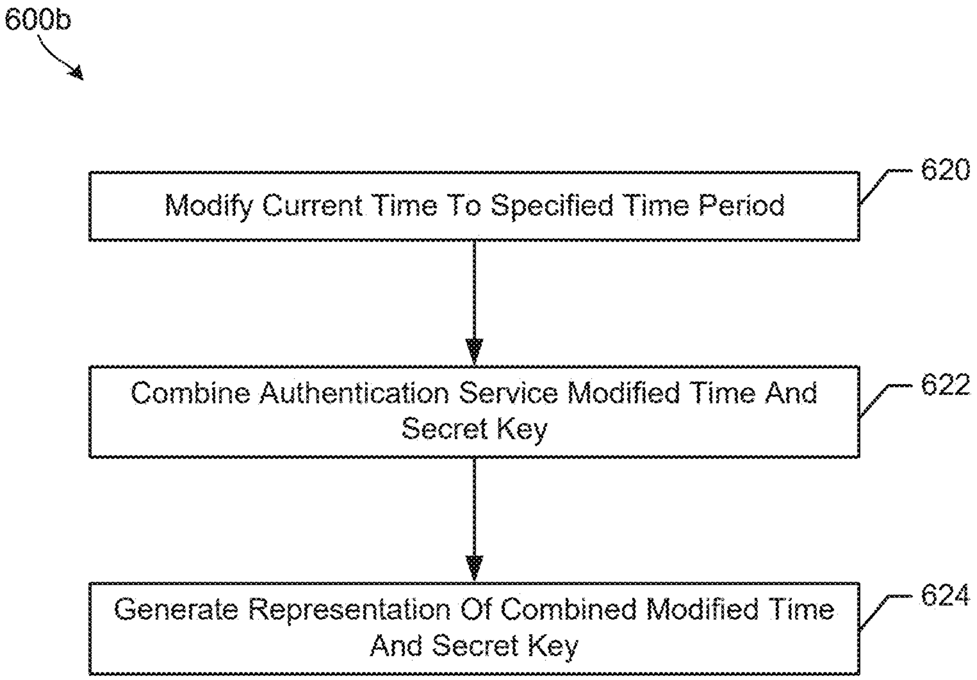

FIGS. 6A and 6B illustrate embodiment methods 600*a*, 600*b* for implementing time-based client-side signing of CDN URIs suitable for use with various embodiments. With reference to FIGS. 1A-6B, the processing system 306, may be configured with executable modules 308-312 to implement operations of the methods 600*a*, 600*b*.

With reference to the method 600*a* illustrated in FIG. 6A, in block 602, the processing system 306 may synchronize a secret key with a CDN 150, including one or more CDN devices 400. For example, the processing system 306 may send the CDN 150 a secret key\. For another example, the processing system 306 may send the CDN 150 a parameter for algorithmically generating a secret key or selecting a secret key from a set of secret keys. The shared secret key may be configured such that the secret key at the CDN device 400 matches a secret key at the processing system 306.

In block 604, the processing system 306 may receive a stream request from a streaming media device 200. The stream request may include information that may enable the processing system 306 to authenticate the streaming media device 200 requesting streaming media and/or a user of the streaming media device 200 requesting the streaming media. For example, the stream request may identify the streaming media device 200, the user of the streaming media device 200, the streaming media platform or service from which the streaming media is requested, and/or the requested streaming media.

In block 606, the processing system 306 may generate an authentication service TOTP. For example, the processing system 306 may generate an authentication service modified time for generating the authentication service TOTP from a current time. The processing system 306 may combine the secret key and the authentication service modified time, generating a combined modified time and secret key, and generate a representation of the combined modified time and secret key as the authentication service TOTP. Generating the authentication service TOTP is described in further detail for the method 600*b* with reference to FIG. 6B.

In block 608, the processing system 306 may encode the authentication service TOTP. Encoding the authentication service TOTP may be part of generating a stream response to transmit the streaming media device 200 in response to the stream request received in block 604. The authentication service TOTP may be encoded separately or with other information included in the stream response. The encoding process or algorithm may be a component of a communication protocol for communication between the processing system 306 and the streaming media device 200 over an operational network 100. The encoding may be implemented for various reasons, such as reliability, efficiency, security, etc. of the communications over the operational network 100. For example, the encoding may be a base64 encoding. In some embodiments, the processing system 306 may also encode the authentication modified time used to generate the authentication service TOTP.

In block 610, the processing system 306 may send the stream response to the streaming media device 200. The stream response may include the authentication service TOTP. In some embodiments, the stream response may include the authentication modified time used to generate the authentication service TOTP.

With reference to the method 600*b* illustrated in FIG. 6B, blocks 620-624 may further describe generating the authentication service TOTP described for block 606 of the method 600*a* with reference to FIG. 6A. In block 620, the processing system 306 may modify a current time to a specified time period. The current time may be modified to correspond with the specified time period. The current time may be modified by implementing one or more operations on the current time so that the current time is modified to correspond with the specified time period. For a non-limiting example, the current time may be rounded up or down to correspond with the specified time period. The specified time period may be, for example, a specified time period of a number of days, such as any number of days between approximately 1 to 7 days, including approximately 2 days, from the current time.

In block 622, the processing system 306 may combine the authentication service modified time and the secret key. The authentication service modified time and the secret key may be combined implementing one or more operations or algorithms on the authentication service modified time and the secret key. Combination of the authentication service modified time and the secret key may be implemented in various manners resulting in any type of combination of the authentication service modified time and the secret key. For a non-limiting example, the characters of the authentication service modified time may follow sequentially the characters of the secret key without any spacing between the characters. The combination of the authentication service modified time and the secret key may be referred to as a combined modified time and secret key or similar.

In block 624, the processing system 306 may generate a representation of the combined modified time and secret key. The representation of the combined modified time and secret key may be generated as an authentication service TOTP. One or more operations or algorithms may be implemented using the combined modified time and secret key to generate the representation of the combined modified time and secret key. The representation of the combined modified time and secret key may be the result of the one or more operations or algorithms such that the representation of the combined modified time and secret key is different from the combined modified time and secret key. For a non-limiting example, the processing system 306 may implement a hashing function, such as SHA-256, to generate the representation of the combined modified time and secret key.

Figure 7A:
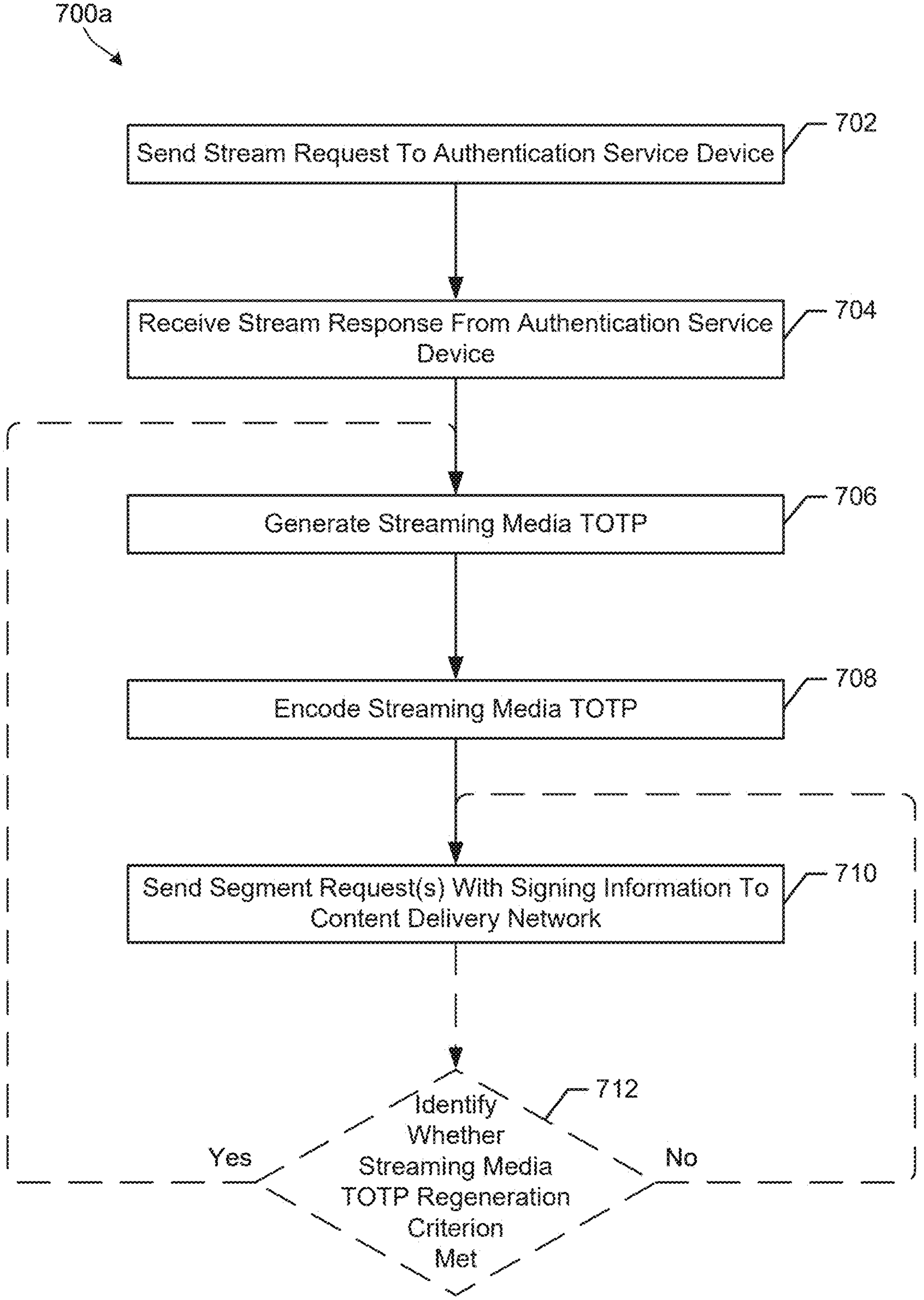
FIGS. 7A and 7B are process flow diagrams illustrating embodiment methods for implementing time-based client-side signing of CDN URIs suitable for use with various embodiments.
Figure 7B:
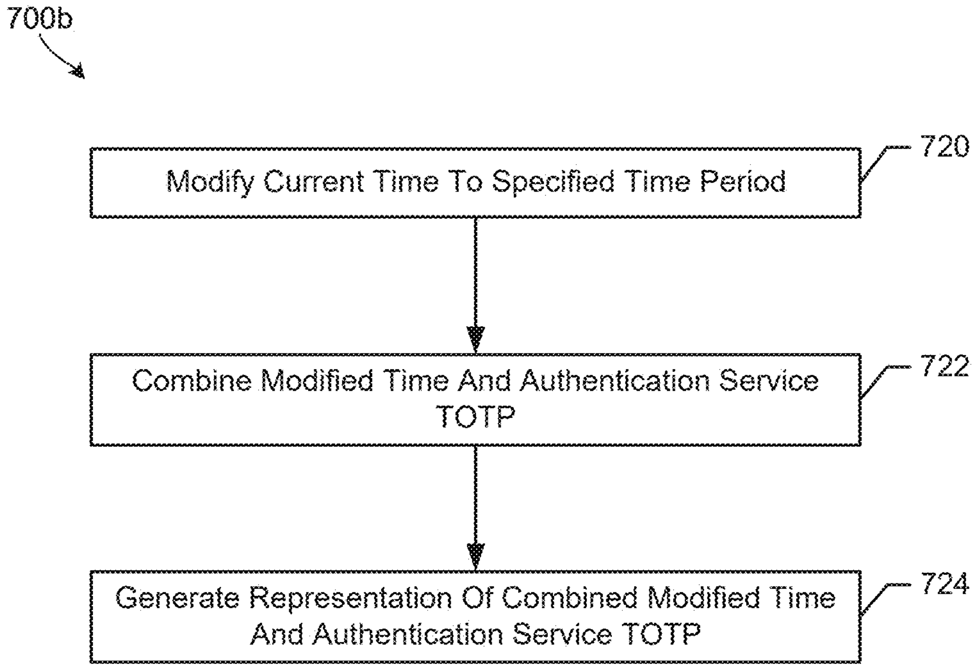

FIGS. 7A and 7B illustrate embodiment methods 700*a*, 700*b* for implementing time-based client-side signing of CDN URIs suitable for use with various embodiments. With reference to FIGS. 1A-7B, the processing system 206, may be configured with executable modules 208-212 to implement operations of the methods 700*a*, 700*b*.

With reference to the method 700*a* illustrated in FIG. 7A, in block 702, the processing system 206 may send a stream request to an authentication service device 300. The stream request may include information that may enable the authentication service device 300 to authenticate the streaming media device 200 requesting streaming media and/or a user of the streaming media device 200 requesting the streaming media. For example, the stream request may identify the streaming media device 200, the user of the streaming media device 200, the streaming media platform or service from which the streaming media is requested, and/or the requested streaming media.

In block 704, the processing system 206 may receive a response to the stream request, or stream response, from the authentication service device 300. The stream response may include an authentication service TOTP. In some embodiments, the stream response may also include an authentication service modified time used by the authentication service device 300 to generate the authentication service TOTP. The processing system 206 may decode the response to the stream request, including decoding the authentication service TOTP. In some embodiments, the processing system 206 may decode the authentication service modified time.

In block 706, the processing system 206 may generate a streaming media TOTP. For example, the processing system 206 may generate a streaming media modified time for generating the streaming media TOTP from a current time.

The streaming media device 200 may combine the authentication service TOTP and the streaming media modified time, generating a combined modified time and authentication service TOTP, and generate a representation of the combined modified time and authentication service TOTP as the streaming media TOTP. Generating the streaming media TOTP is described in further detail for the method 700*b* with reference to FIG. 7B.

In block 708, the processing system 206 may encode the streaming media TOTP. Encoding the streaming media TOTP may be part of generating a segment request to transmit a CDN 150, including at least one CDN device 400, to request a segment of streaming media. The streaming media TOTP may be encoded separately or with other information included in the segment request. The encoding process or algorithm may be a component of a communication protocol for communication between the processing system 206 and the CDN 150 over an operational network 100. The encoding may be implemented for various reasons, such as reliability, efficiency, security, etc. of the communications over the operational network 100. For example, the encoding may be a base64 encoding. In some embodiments, the processing system 206 may also encode the streaming media modified time used to generate the streaming media TOTP and/or the authentication modified time used to generate the authentication service TOTP.

In block 710, the processing system 206 may send the segment request to the CDN 150. The segment request may include URI signing information including a URI for the streaming media that is requested and the streaming media TOTP. The URI may be configured to indicate from which CDN device 400 of the CDN 150 the streaming media is requested. In some embodiments, the URI signing information may include the streaming media modified time used to generate the streaming media TOTP and/or the authentication modified time used to generate the authentication service TOTP. In some embodiments, sending the segment request to the CDN 150 may be repeated for subsequent segments of the streaming media that is requested. For example, sending the segment request to the CDN 150 may be repeated following receiving a segment of the streaming media that is requested from the CDN 150. In some embodiments, sending the segment request to the CDN 150 may be repeated until a streaming media TOTP regeneration criterion is met.

In optional determination block 712, the processing system 206 may identify whether the streaming media TOTP regeneration criterion is met. Rather than using the same streaming media TOTP in one or more subsequent segment requests, based on meeting the streaming media TOTP regeneration criterion, the processing system 206 may generate a subsequent streaming media TOTP and send the subsequent streaming media TOTP with a subsequent segment request. In some embodiments, the processing system 206 may continuously, periodically, or episodically generate streaming media TOTPs based on meeting the streaming media TOTP regeneration criterion. For example, the streaming media TOTP regeneration criterion may be a number of segment requests. The processing system 206 generate a streaming media TOTP for each one or more segment requests for the streaming media. For another example, the streaming media TOTP regeneration criterion may be a validity of the streaming media modified time. The streaming media modified time may be valid for as long as the specified time period used to generate the streaming media modified time. Lapse of the specified time period may prompt the processing system 206 to generate a successive streaming media TOTP based on a successive streaming media modified time and the authentication service TOTP.

In response to identifying that the streaming media TOTP regeneration criterion is met (i.e., optional determination block 712="Yes"), the processing system 206 may generate a streaming media TOTP in block 706. The streaming media TOTP may be referred to as a subsequent streaming media TOTP in relation to a prior streaming media TOTP. In response to identifying that the streaming media TOTP regeneration criterion is not met (i.e., optional determination block 712="No"), the processing system 206 may send a segment request to the CDN 150 in block 710. The segment request may be referred to a subsequent segment request in relation to a prior segment request. The subsequent segment request may include the subsequent streaming media TOTP for circumstances where the streaming media TOTP regeneration criterion is met. The subsequent segment request may include the streaming media TOTP or the subsequent streaming media TOTP for circumstances where the streaming media TOTP regeneration criterion is not met, depending on which streaming media TOTP is last generated.

With reference to the method 700*b* illustrated in FIG. 7B, blocks 720-724 may further describe generating the streaming media TOTP described for block 706 of the method 700*a* with reference to FIG. 7A. In block 720, the processing system 206 may modify a current time to a specified time period. The current time may be modified to correspond with the specified time period. The current time may be modified by implementing one or more operations on the current time so that the current time is modified to correspond with the specified time period. For a non-limiting example, the current time may be rounded up or down to correspond with the specified time period. The specified time period may be, for example, a number of seconds, such as any number of seconds between approximately 1 to 60 seconds, including approximately 30 seconds, from the current time.

In block 722, the processing system 206 may combine the streaming media modified time and the authentication service TOTP. The streaming media modified time and the authentication service TOTP may be combined by implementing one or more operations or algorithms on the streaming media modified time and the authentication service TOTP. Combination of the streaming media modified time and the authentication service TOTP may be implemented in various manners resulting in any type of combination of the streaming media modified time and the authentication service TOTP. For a non-limiting example, the characters of the streaming media modified time may follow sequentially the characters of the authentication service TOTP without any spacing between the characters. The combination of the streaming media modified time and the authentication service TOTP may be referred to as a combined modified time and authentication service TOTP or similar.

In block 724, the processing system 206 may generate a representation of the combined modified time and authentication service TOTP. The representation of the combined modified time and authentication service TOTP may be generated as a streaming media TOTP. One or more operations or algorithms may be implemented using the combined modified time and authentication service TOTP to generate a representation of the combined modified time and authentication service TOTP. The representation of the combined modified time and authentication service TOTP may be the result of the one or more operations or algorithms such that the representation of the combined modified time and authentication service TOTP is different from the combined modified time and authentication service TOTP. For a non-limiting example, the processing system 206 may implement a hashing function, such as SHA-256, to generate the representation of the combined modified time and authentication service TOTP.

Figure 8A:
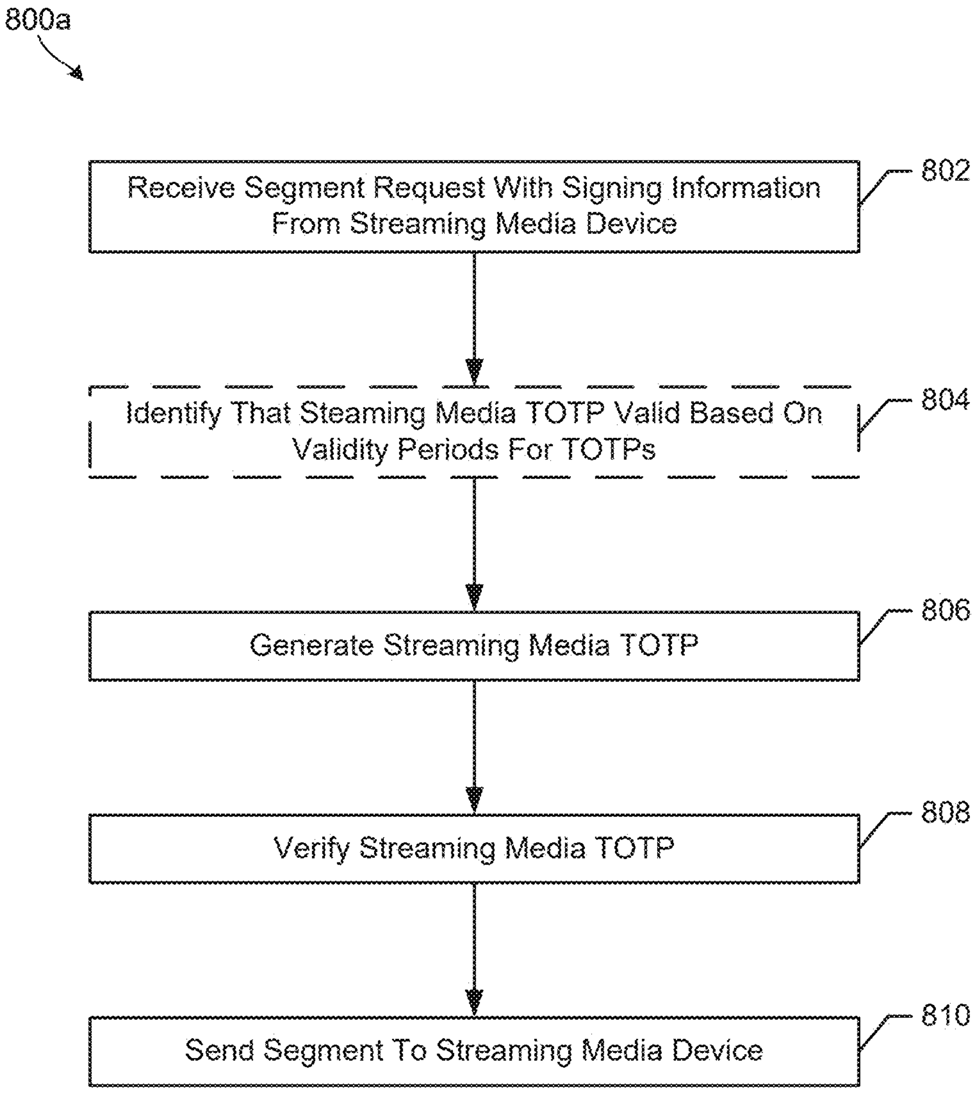
FIGS. 8A and 8B are process flow diagrams illustrating embodiment methods for implementing time-based client-side signing of CDN URIs suitable for use with various embodiments.
Figure 8B:
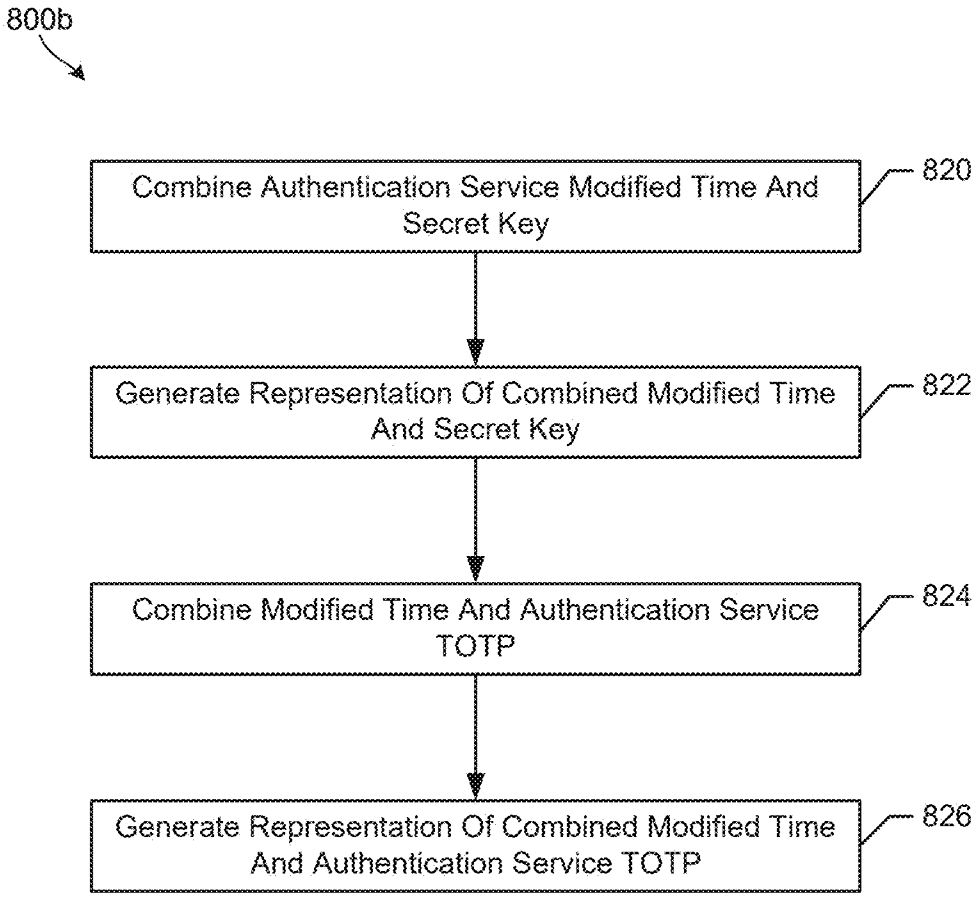

FIGS. 8A and 8B illustrates an embodiment methods 800*a*, 800*b* for implementing time-based client-side signing of CDN URIs suitable for use with various embodiments. With reference to FIGS. 1A-8B, the processing system 406, may be configured with executable modules 408-412 to implement operations of the methods 800*a*, 800*b*.

With reference to the method 800*a* illustrated in FIG. 8A, in block 802, the processing system 406 may receive a segment request with URI signing information from a streaming media device 200. The URI signing information may include a URI for the streaming media that is requested and an streaming media TOTP. The URI may be configured to indicate from which CDN device 400 of the CDN 150 the streaming media is requested. In some embodiments, the URI signing information may include a streaming media modified time used to generate the streaming media TOTP and/or an authentication modified time used to generate an authentication service TOTP.

In optional block 804, the processing system 406 may identify the streaming media TOTP is valid, or not expired, based on a validity period for the streaming media modified time and/or the authentication service modified time. The processing system 406 may determine whether the authentication service modified time and/or the streaming media modified time are valid, or not expired, based on various criteria, such as times or dates or expiration or length of a validity period. For a valid the authentication service modified time and/or the streaming media modified time, the streaming media TOTP may be valid.

In block 806, the processing system 406 may generate, or regenerate, a streaming media TOTP. For example, the processing system 406 may generate, or regenerate, an authentication service TOTP based on a secret key shared with an authentication service device 300 and the authentication service modified time received with the segment request. The processing system 406 may generate the streaming media TOTP based on the authentication service TOTP and the streaming media modified time received with the segment request. Generating the streaming media TOTP is described in further detail for the method 800*b* with reference to FIG. 8B. In some embodiments, generating the streaming media TOTP in block 806 may be implemented in response to identifying the streaming media TOTP is valid in optional block 804.

In block 808, the processing system 406 may verify the streaming media TOTP received with the segment request. Verification of the streaming media TOTP may be accomplished by comparing the streaming media TOTP received with the segment request and the streaming media TOTP generated by the processing system 406. Matching streaming media TOTPs may indicate that the streaming media TOTP received with the segment request is verified.

In block 810, the processing system 406 may send a segment of the streaming media requested by the segment request to the streaming media device 200 in response to verifying the streaming media TOTP received with the segment request. The verified streaming media TOTP may enable the processing system 406 to retrieve the segment of the streaming media, and generate and send the segment to the requesting streaming media device 200.

With reference to the method 800*b* illustrated in FIG. 8B, in block 820, the processing system 406 may combine the authentication service modified time received with the segment request and the secret key shared with the authentication service device 300. The authentication service modified time and the secret key may be combined implementing one or more operations or algorithms on the authentication service modified time and the secret key. Combination of the authentication service modified time and the secret key may be implemented in various manners resulting in any type of combination of the authentication service modified time and the secret key. For a non-limiting example, the characters of the authentication service modified time may follow sequentially the characters of the secret key without any spacing between the characters. The combination of the authentication service modified time and the secret key may be referred to as a combined modified time and secret key or similar.

In block 822, the processing system 406 may generate a representation of the combined modified time and secret key generated by the processing system 406. The representation of the combined modified time and secret key may be generated as an authentication service TOTP. One or more operations or algorithms may be implemented using the combined modified time and secret key to generate the representation of the combined modified time and secret key. The representation of the combined modified time and secret key may be the result of the one or more operations or algorithms such that the representation of the combined modified time and secret key is different from the combined modified time and secret key. For a non-limiting example, the processing system 406 may implement a hashing function, such as SHA-256, to generate the representation of the combined modified time and secret key.

In block 824, the processing system 406 may combine the streaming media modified time received with the segment request and the authentication service TOTP generated by the processing system 406. The streaming media modified time and the authentication service TOTP may be combined by implementing one or more operations or algorithms on the streaming media modified time and the authentication service TOTP. Combination of the streaming media modified time and the authentication service TOTP may be implemented in various manners resulting in any type of combination of the streaming media modified time and the authentication service TOTP. For a non-limiting example, the characters of the streaming media modified time may follow sequentially the characters of the authentication service TOTP without any spacing between the characters. The combination of the streaming media modified time and the authentication service TOTP may be referred to as a combined modified time and authentication service TOTP or similar.

In block 826, the processing system 406 may generate a representation of the combined modified time and authentication service TOTP generated by the processing system 406. The representation of the combined modified time and authentication service TOTP may be generated as a streaming media TOTP. One or more operations or algorithms may be implemented using the combined modified time and authentication service TOTP to generate a representation of the combined modified time and authentication service TOTP. The representation of the combined modified time and authentication service TOTP may be the result of the one or more operations or algorithms such that the representation of the combined modified time and authentication service TOTP is different from the combined modified time and authentication service TOTP. For a non-limiting example, the processing system 406 may implement a hashing function, such as SHA-256, to generate the representation of the combined modified time and authentication service TOTP.

Figure 9:
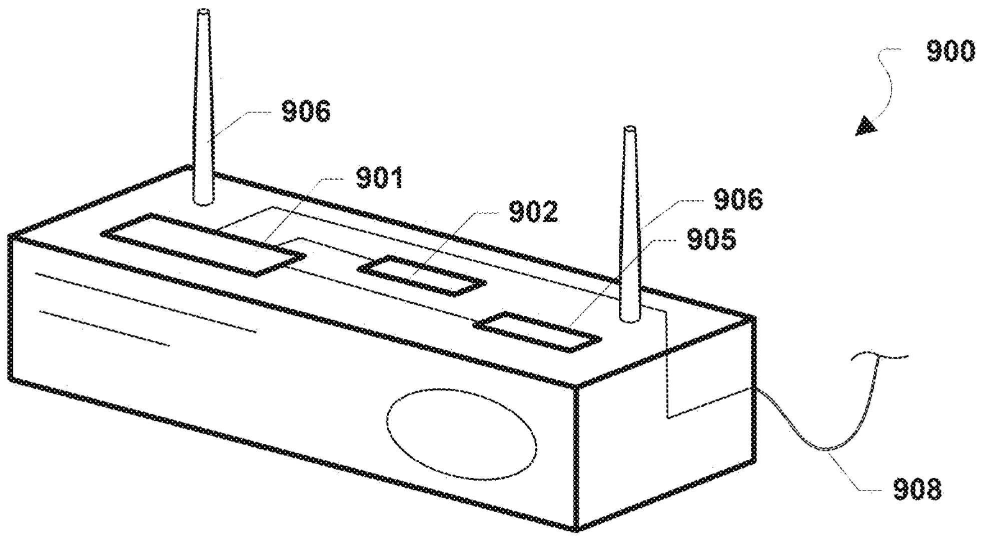
FIG. 9 is a component diagram of an example network hardware suitable for use with various embodiments.

The various embodiments (including, but not limited to, embodiments discussed above with reference to FIGS. 1A-8B) may be implemented for any of a variety network hardware, as illustrated in FIG. 9. With reference to FIGS. 1A-9, a network hardware 900 may include a processor 901 coupled to volatile memory 902. The network hardware 900 may also include one or more connections or port(s) 908 coupled to the processor 901 and configured to input and/or output data from the port(s) 908. The network hardware 900 may also include one or more network transceivers 905, with one or more antenna 906 coupled thereto, providing a network access port, coupled to the processor 901 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The network hardware 900 may transmit and/or receive data or other communications via the network transceiver 905 and/or the port(s) 908.

Figure 10:
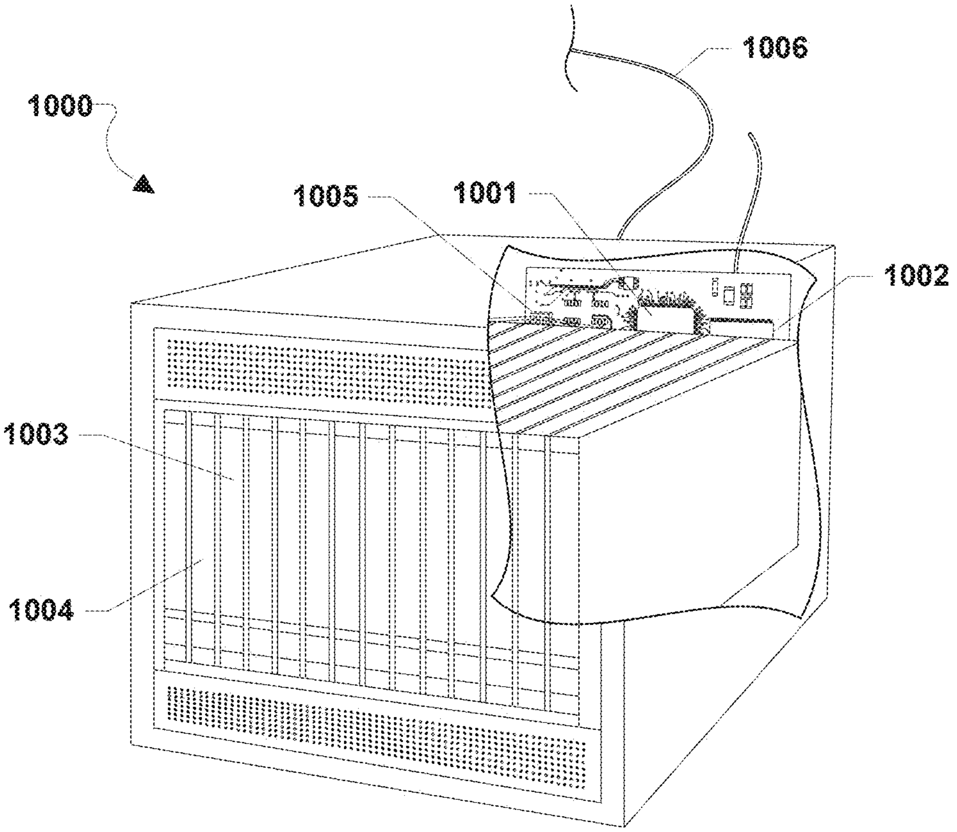
FIG. 10 is a component diagram of an example server suitable for use with the various embodiments.

Various embodiments (including, but not limited to, embodiments discussed above with reference to FIGS. 1A-8B) may be implemented on any of a variety of commercially available servers (e.g., computing device 160), which may be connected to network hardware (e.g., network hardware 900) at one or more network hardware sites (e.g., network hardware sites 142, 144, 146, 148) such as the server 1000 illustrated in FIG. 10. The server 1000 may include a processor 1001 coupled to volatile memory 1002 and a large capacity nonvolatile memory, such as a disk drive 1003 (e.g., data storage device 152). The server 1000 may also include a floppy disc drive, compact disc (CD) or DVD disc drive 1004 coupled to the processor 1001. The server 1000 may also include network access ports 1006 coupled to the processor 1001 for establishing data connections with a network connection circuit 1005 and a communication network (e.g., communication) coupled to other communication system network elements.

Figure 11:
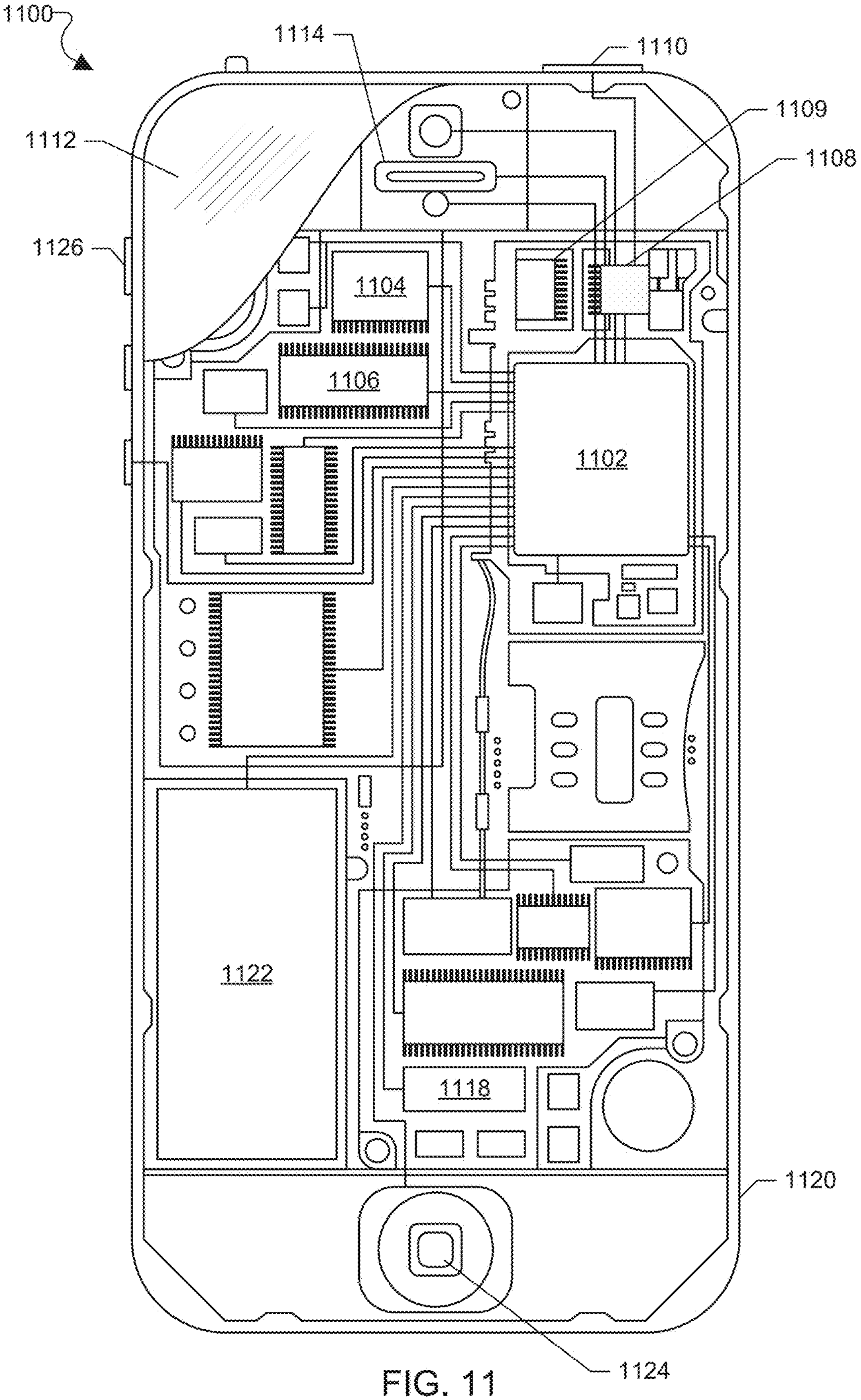
FIG. 11 is a component diagram of an example mobile computing device suitable for use with the various embodiments.

A system in accordance with the various embodiments (including, but not limited to, embodiments described above with reference to FIGS. 1A-8B) may be implemented in a wide variety of computing systems including mobile computing devices, an example of which suitable for use with the various embodiments is illustrated in FIG. 11. The mobile computing device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may also be secure and/or encrypted memory, unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the mobile computing device 1100 need not have touch screen capability.

The mobile computing device 1100 may have one or more radio signal transceivers 1108 (e.g., Peanut, Bluetooth, ZigBee, Wi-Fi, RF radio) and antennae 1110, for sending and receiving communications, coupled to each other and/or to the processor 1102. The processor 1102 may also be coupled to a cellular network wireless modem 1109 that enables communication via a cellular network (e.g., a 5G network) via the antenna 1110. The transceivers 1108 and antennae 1110 may be used with the above-mentioned circuitry to implement the various wireless transmission protocol stacks and interfaces.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as Universal Serial Bus (USB), FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components described herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

Figure 12:
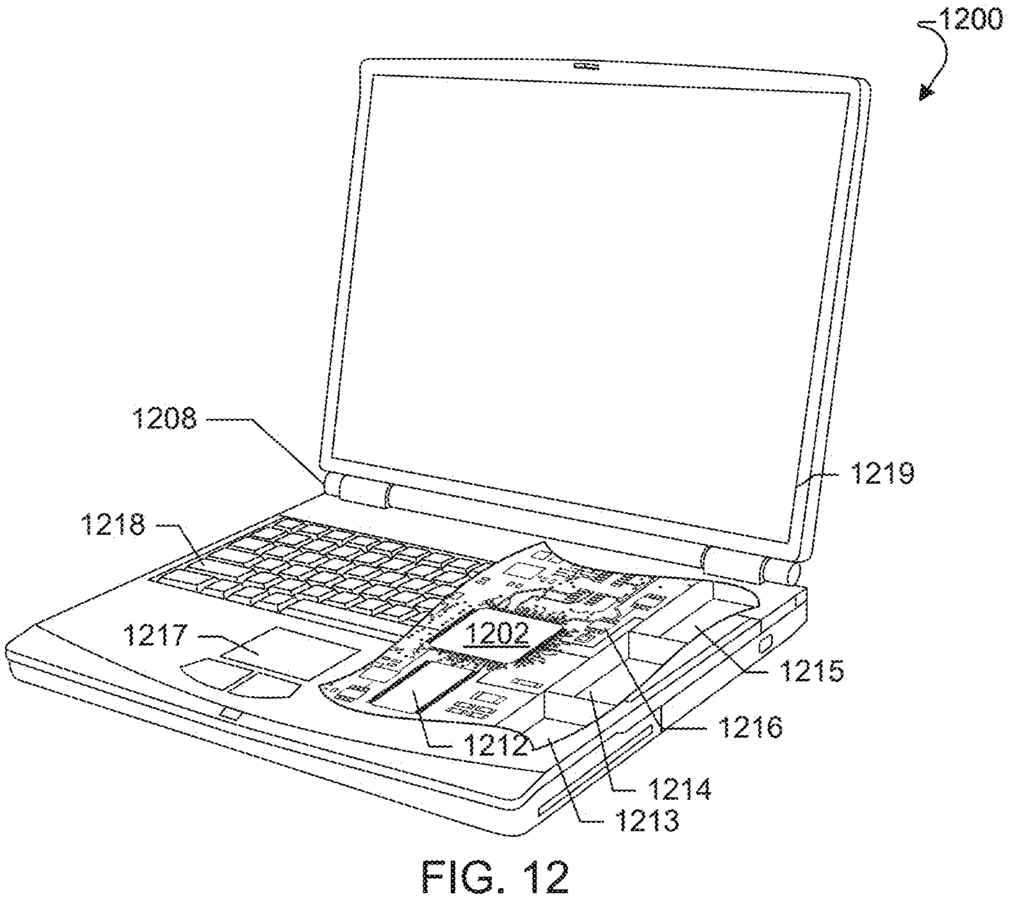
FIG. 12 is a component diagram of an example computing device suitable for use with the various embodiments.

A system in accordance with the various embodiments (including, but not limited to, embodiments described above with reference to FIGS. 1A-8B) may be implemented in a wide variety of computing systems including a laptop computer 1200, an example of which is illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a processor 1202 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1202. The computer 1200 may also include a floppy disc drive 1214 and a compact disc (CD) drive 1215 coupled to the processor 1202. In a notebook configuration, the computer housing includes the touchpad 1217, the keyboard 1218, and the display 1219 all coupled to the processor 1202. Other configurations of the computing device may include a computer mouse or trackball coupled to the processor (e.g., via a USB input) as are well known, which may also be used in conjunction with the various embodiments.

The processors 901, 1001, 1102, 1202 may be any one or more programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 901, 1001, 1102, 1202. The processors 901, 1001, 1102, 1202 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 901, 1001, 1102, 1202 including internal memory or removable memory plugged into the device and memory within the processors 901, 1001, 1102, 1202 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for time-based signing of content delivery network (CDN) universal resource identifiers (URIs) implemented by a processing system of a streaming media device, comprising:

receiving a first time-based one-time password (TOTP) from an authentication service device;

generating a second TOTP based on the first TOTP, wherein generating the second TOTP based on the first TOTP comprises:

combining a modified time and the first TOTP generating a combined modified time and first TOTP; and generating a representation of the combined modified time and first TOTP as the second TOTP; and sending a first segment request with a first signing information including the second TOTP to a CDN.

2. The method of claim 1, further comprising modifying a current time generating the modified time.

3. The method of claim 1, further comprising:

generating a third TOTP based on the first TOTP; and sending a second segment request with a second signing information including the third TOTP to the CDN.

4. The method of claim 3, further comprising determining that a TOTP regeneration criterion is met, wherein generating the third TOTP based on the first TOTP comprises generating the third TOTP based on the first TOTP in response to determining that the TOTP regeneration criterion is met, including:

modifying a current time generating a modified time;

combining the modified time and the first TOTP generating a combined modified time and first TOTP; and generating a representation of the combined modified time and first TOTP as the second TOTP.

5. The method of claim 1, further comprising sending a stream request to the authentication service device, wherein receiving the first TOTP from the authentication service device comprises receiving the first TOTP generated by the authentication service device in response to the stream request.

6. The method of claim 1, wherein the first TOTP comprises a representation of a combined modified time and secret key shared between the authentication service device and the CDN.

7. The method of claim 1, wherein the first signing information further includes a first modified time used for generating the first TOTP and a second modified time used for generating the second TOTP.

8. The method of claim 1, further comprising receiving a segment from the CDN in response to the CDN verifying the second TOTP.

9. A computing device, comprising:

a memory;

a communication system; and a processing system coupled to the memory and the communication system and configured with processor-executable instructions to perform operations comprising:

receiving a first time-based one-time password (TOTP) from an authentication service device;

generating a second TOTP based on the first TOTP, wherein generating the second TOTP based on the first TOTP comprises:

combining a modified time and the first TOTP generating a combined modified time and first TOTP; and generating a representation of the combined modified time and first TOTP as the second TOTP; and sending a first segment request with a first signing information including the second TOTP to a content delivery network (CDN).

10. The computing device of claim 9, wherein the processing system is further configured with processor-executable instructions to perform operations comprising modifying a current time generating the modified time.

11. The computing device of claim 9, wherein the processing system is further configured with processor-executable instructions to perform operations comprising:

generating a third TOTP based on the first TOTP; and sending a second segment request with a second signing information including the third TOTP to the CDN.

12. The computing device of claim 11, wherein the processing system is further configured with processor-executable instructions to perform operations comprising determining that a TOTP regeneration criterion is met, wherein generating the third TOTP based on the first TOTP comprises generating the third TOTP based on the first TOTP in response to determining that the TOTP regeneration criterion is met, including:

modifying a current time generating a modified time;

combining the modified time and the first TOTP generating a combined modified time and first TOTP; and generating a representation of the combined modified time and first TOTP as the second TOTP.

13. The computing device of claim 9, wherein the processing system is further configured with processor-executable instructions to perform operations comprising sending a stream request to the authentication service device, wherein receiving the first TOTP from the authentication service device comprises receiving the first TOTP generated by the authentication service device in response to the stream request.

14. The computing device of claim 9, wherein the processing system is further configured with processor-executable instructions to perform operations such that the first TOTP comprises a representation of a combined modified time and secret key shared between the authentication service device and the CDN.

15. The computing device of claim 9, wherein the processing system is further configured with processor-executable instructions to perform operations such that the first signing information further includes a first modified time used for generating the first TOTP and a second modified time used for generating the second TOTP.

16. The computing device of claim 9, wherein the processing system is further configured with processor-executable instructions to perform operations comprising receiving a segment from the CDN in response to the CDN verifying the second TOTP.

17. A method for time-based signing of content delivery network (CDN) universal resource identifiers (URIs) implemented by a processing system of an authentication service device, comprising:

generating a time-based one-time password (TOTP) based on a modified time and a secret key shared with a CDN, wherein generating the TOTP based on the modified time and the secret key shared with the CDN comprises:

combining the modified time and the secret key shared with the CDN generating a combined modified time and secret key; and generating a representation of the combined modified time and secret key as the TOTP; and sending the TOTP to a streaming media device.

18. The method of claim 17, further comprising modifying a current time generating the modified time.

19. The method of claim 17, further comprising receiving a stream request from the streaming media device, wherein generating the TOTP based on the modified time and the secret key shared with the CDN occurs in response to receiving the stream request from the streaming media device.

20. The method of claim 17, further comprising sending the modified time to the streaming media device.

21. The method of claim 17, further comprising sharing the secret key with the CDN.

22. A computing device, comprising:

a memory;

a communication system; and a processing system coupled to the memory and the communication system and configured with processor-executable instructions to perform operations comprising:

generating a time-based one-time password (TOTP) based on a modified time and a secret key shared with a content delivery network (CDN), wherein generating the TOTP based on the modified time and the secret key shared with the CDN comprises:

combining the modified time and the secret key shared with the CDN generating a combined modified time and secret key; and generating a representation of the combined modified time and secret key as the TOTP; and sending the TOTP to a streaming media device.

23. The computing device of claim 22, wherein the processing system is further configured with processor-executable instructions to perform operations comprising modifying a current time generating the modified time.

24. The computing device of claim 22, wherein the processing system is further configured with processor-executable instructions to perform operations comprising receiving a stream request from the streaming media device, wherein generating the TOTP based on the modified time and the secret key shared with the CDN occurs in response to receiving the stream request from the streaming media device.

25. The computing device of claim 22, wherein the processing system is further configured with processor-executable instructions to perform operations comprising sending the modified time to the streaming media device.

26. The computing device of claim 22, wherein the processing system is further configured with processor-executable instructions to perform operations comprising sharing the secret key with the CDN.

27. A method for time-based signing of content delivery network (CDN) universal resource identifiers (URIs) implemented by a processing system of a CDN device, comprising:

receiving, from a streaming media device, a segment request and a first time-based one-time password (TOTP) generated by the streaming media device, wherein the first TOTP is generated by the streaming media device by combining a first modified time and an authentication service TOTP generating a combined first modified time and authentication service TOTP, and generating a representation of the combined first modified time and authentication service TOTP as the first TOTP;

verifying the first TOTP; and sending a segment to the streaming media device in response to verifying the first TOTP.

28. The method of claim 27, wherein verifying the first TOTP comprises:

generating a second TOTP; and verifying that the first TOTP and the second TOTP match.

29. The method of claim 28, further comprising:

receiving, from the streaming media device, a first modified time used for generating the first TOTP and a second modified time used for generating a third TOTP; and generating the third TOTP based on the second modified time and a secret key shared with an authentication service, wherein generating the second TOTP comprises generating the second TOTP based on the first modified time and the third TOTP.

30. The method of claim 29, wherein:

generating the third TOTP based on the second modified time and the secret key shared with the authentication service, comprises:

combining the second modified time and the secret key shared with the authentication service generating a combined second modified time and secret key; and generating a representation of the combined second modified time and secret key as the third TOTP; and generating the second TOTP based on the first modified time and the third TOTP comprises:

combining the first modified time and the third TOTP generating a combined first modified time and third TOTP; and generating a representation of the combined first modified time and third TOTP as the second TOTP.

31. The method of claim 27, further comprising:

receiving, from the streaming media device, a first modified time used for generating the first TOTP and a second modified time used for generating a third TOTP; and verifying that the first modified time and the second modified time are valid, wherein verifying the first TOTP occurs in response to verifying that the first modified time and the second modified time are valid.

32. A computing device, comprising:

a memory;

a communication system; and a processing system coupled to the memory and the communication system and configured with processor-executable instructions to perform operations comprising:

receiving, from a streaming media device, a segment request and a first time-based one-time password (TOTP) generated by the streaming media device, wherein the first TOTP is generated by the streaming media device by combining a first modified time and an authentication service TOTP generating a combined first modified time and authentication service TOTP, and generating a representation of the combined first modified time and authentication service TOTP as the first TOTP;

verifying the first TOTP; and sending a segment to the streaming media device in response to verifying the first TOTP.

33. The computing device of claim 32, wherein the processing system is further configured with processor-executable instructions to perform operations such that verifying the first TOTP comprises:

generating a second TOTP; and verifying that the first TOTP and the second TOTP match.

34. The computing device of claim 33, wherein the processing system is further configured with processor-executable instructions to perform operations comprising:

receiving, from the streaming media device, a first modified time used for generating the first TOTP and a second modified time used for generating a third TOTP; and generating the third TOTP based on the second modified time and a secret key shared with an authentication service, wherein generating the second TOTP comprises generating the second TOTP based on the first modified time and the third TOTP.

35. The computing device of claim 34, wherein the processing system is further configured with processor-executable instructions to perform operations such that:

generating the third TOTP based on the second modified time and the secret key shared with the authentication service, comprises:

combining the second modified time and the secret key shared with the authentication service generating a combined second modified time and secret key; and generating a representation of the combined second modified time and secret key as the third TOTP; and generating the second TOTP based on the first modified time and the third TOTP comprises:

combining the first modified time and the third TOTP generating a combined first modified time and third TOTP; and generating a representation of the combined first modified time and third TOTP as the second TOTP.

36. The computing device of claim 32, wherein the processing system is further configured with processor-executable instructions to perform operations comprising:

receiving, from the streaming media device, a first modified time used for generating the first TOTP and a second modified time used for generating a third TOTP; and verifying that the first modified time and the second modified time are valid, wherein verifying the first TOTP occurs in response to verifying that the first modified time and the second modified time are valid.

* * * * *